(12) United States Patent
Kojitani et al.

(10) Patent No.: US 7,860,620 B2
(45) Date of Patent: Dec. 28, 2010

(54) INSPECTION APPARATUS

(75) Inventors: Kazuto Kojitani, Osaka (JP); Hiroshi Tasaki, Kyoto (JP); Hiroshi Nakajima, Kyoto (JP); Seiko Ito, Nara (JP)

(73) Assignee: OMRON Corporation, Kyoto (JP)

( * ) Notice: Subject to any disclaimer, the term of this patent is extended or adjusted under 35 U.S.C. 154(b) by 902 days.

(21) Appl. No.: 11/801,417

(22) Filed: May 9, 2007

(65) Prior Publication Data

US 2007/0265743 A1 Nov. 15, 2007

(30) Foreign Application Priority Data

May 9, 2006 (JP) .............................. 2006-130723
Mar. 28, 2007 (JP) .............................. 2007-085898

(51) Int. Cl.
*G01M 17/00* (2006.01)
(52) U.S. Cl. .......................................... 701/29; 701/35
(58) Field of Classification Search ............. 701/29–36; 73/66, 460

See application file for complete search history.

(56) References Cited

U.S. PATENT DOCUMENTS 7,796,278 B2 * 9/2010 Spalding et al. ............. 356/639

OTHER PUBLICATIONS

Hiroshi Tasaki, Kazuto Kojitani, Hiroshi Nakajima, "A Method of a Progressive Detection Model for Automated Sensory Inspection Systems", Journal of SICE Symposium on Intelligent Systems, vol. 32, No. 05SY0003, pp. 243-246 (2005).

Asa Ben-Hur, David Horn, Hava T. Siegelmann, Vladimir Vapnik, "Support Vector Clustering", Journal of Machine Learning Research 2, pp. 125-137 (2001).

Nello Cristianini, John Shawe-Taylor, "An Introduction to Support Vector Machines and Other Kernel-Based Learning Methods", Cambridge University Press (2000).

Nello Cristianini, John Shawe-Taylor, "An Introduction to Support Vector Machines: and Other Kernel-Based Learning Methods," Cambridge University Press (2000), 14 pages.

Partial European Search Report issued in European Application No. 07 10 7856 mailed on Oct. 25, 2007, 8 pages.

(Continued)

*Primary Examiner*—Richard M. Camby
(74) *Attorney, Agent, or Firm*—Osha Liang LLP

(57) ABSTRACT

An inspection apparatus includes a discrimination function determination unit which determines whether or not a discrimination function forms an area including a discrimination sample. The discrimination function is used in non-parametric one-class discrimination. The discrimination sample is discriminated into a class as a single area in an input space where learning samples are plotted.

12 Claims, 26 Drawing Sheets

OTHER PUBLICATIONS

Nandi S. et al.: "Condition Monitoring and Fault Diagnosis of Electrical Machines—A Review" Industry Applications Conference, 1999. Thirty-Fourth IAS Annual Meeting. Conference Record of The 1999 IEEE Piscataway, NJ, USA, IEEE, US, vol. 1, Oct. 3, 1999, pp. 197-204, XP010355174 ISBN: 0-7803-5589-X *sec. III* *abstract; figure 2*.

Gao R. X. et al.: "PCA-Based Feature Selection Scheme for Machine Defect Classification" IEEE Transactions on Instrumentation and Measurement, IEEE Service Center, Piscataway, NJ, US, vol. 53, No. 6, Dec. 2004, pp. 1517-1525, XP011122355 ISSN: 0018-9456 *secs. V and VI* *abstract; figures 4,6,7*.

Jugan J.: "Advanced Methods of Motor Testing" Electrical Electronics Insulation Conference and Electrical Manufacturing & Coil Winding Conference, 1993. Proceedings., Chicago '93 EEIS/ICWA Exposition Chicago, IL, USA Oct. 4-7, 1993, New York, NY, USA, IEEE, Oct. 4, 1993, pp. 287-290, X010246543 ISBN:0-7803-0847-6 *abstract; figure 2* *p. 289-p. 290*.

Reimche W. et al.: "Basics of Vibration Monitoring for Fault Detection and Process Control" Pro. 3rd Pan-Am. Conf. for Nondestructive Testing—PANNDT, [Online]Jun. 2, 2003-Jun. 6, 2003 pp. 1-10, XP002454577 Rio de Janeiro, Brazil Retrieved from the Internet: URL: http://www.aaende.org.ar/ingles/sitio/biblioteca/material/T-039.pdf> [retrieved on Oct. 11, 2007] *the whole document*.

Europeam Search Opinion for European Application No. 07107856.2-2218, dated Jun. 19, 2008 (4 Pages).

* cited by examiner

Input space with no soft margin

Hilbert space with no soft margin

Input space with soft margin

Hilbert space with soft margin

Learning sample discriminated as defective product

Center

In the case where hole exists in acceptable area

Acceptable area is not formed in convex shape

Large V

Middle V

Small V

Large r

Middle r

Small r

Large σ

Middle σ

Small σ

Fig. 16A

Learning sample

| ID# | Class | $x_1$ | $x_2$ | ... |
|---|---|---|---|---|
| 0001 | Acceptable product | 18 | 220 | ... |
| 0002 | Acceptable product | 10 | 333 | ... |
| 0003 | Acceptable product | 24 | 320 | ... |
| ⋮ | ⋮ | ⋮ | ⋮ | |

Fig. 16B

Parameter candidate

| $\sigma$ |
|---|
| 50 |
| 40 |
| 30 |
| ⋮ |

Fig. 16C

Discrimination function

Class= Acceptable product $[f(x) \geqq 0]$
Defective product $[f(x) < 0]$ $f(x) = 2.3x_1 + 3.4\,x_2 + 2.3x_3 - 5.6$ \* $x_1$, $x_2$, and $x_3$ are support vectors Line segment does not deviate from acceptable area Line segment deviates from acceptable area

Fig. 21A

| Line segment ID# | Extraction point serial number | $x_1$ | $x_2$ | ⋮ |
|---|---|---|---|---|
| 0001-0002 | 0001 | 18 | 220 | ⋮ |
| | 0002 | 16 | 248 | ⋮ |
| | 0003 | 14 | 277 | ⋮ |
| | 0004 | 12 | 305 | ⋮ |
| | 0005 | 10 | 330 | ⋮ |
| 0001-0003 | 0001 | 18 | 220 | ⋮ |
| | 0002 | 19.5 | 245 | ⋮ |
| | 0003 | 21 | 270 | ⋮ |
| ⋮ | | | | |

Fig. 21B

| Line segment ID# | Extraction point serial number | $x_1$ | $x_2$ | ⋮ |
|---|---|---|---|---|
| 0001-0002 | 0001 | 16 | 248 | ⋮ |
| | 0002 | 14 | 277 | ⋮ |
| | 0003 | 12 | 305 | ⋮ |
| 0001-0003 | 0001 | 19.5 | 245 | ⋮ |
| | 0002 | 21 | 270 | ⋮ |
| ⋮ | | | | |

Fig. 21C

| Line segment ID# | Extraction point serial number | $x_1$ | $x_2$ | ⋮ |
|---|---|---|---|---|
| 0001-0002 | 0001 | 17.3 | 291 | ⋮ |
| | 0001 | 17 | 280 | ⋮ |
| | 0002 | 16.7 | 270 | ⋮ |
| | 0003 | 16.3 | 259 | ⋮ |
| 0001-0003 | 0001 | 17.5 | 273 | ⋮ |
| | 0002 | 17.7 | 256 | ⋮ |
| ⋮ | | | | |

Acceptable area is divided into plurality of areas
because the number of samples is small Acceptable area becomes single
because parameter is appropriately set

INSPECTION APPARATUS

BACKGROUND OF THE RELATED ART

1. Field of the Invention

The present invention relates to an inspection apparatus which extracts a characteristic value from inputted measurement data of an inspection target to make a determination of a state of the inspection target based on the extracted characteristic value.

2. Description of the Related Art

A number of rotary machines, in which drive-system components such as a motor, are incorporated are used in automobiles and home electric appliances. For example, in automobiles, the rotary machines are mounted on an engine, a power steering, a power seat, a transmission, and many other parts. In home electric appliances, the rotary machines are mounted in a refrigerator, an air conditioner, a washing machine, and various other products. When the rotary machine is operated, a sound is generated by rotation of the motor.

The sound generated by the rotation of the motor includes a sound, which is inevitably generated by the normal operation and a sound generated by a defect. The abnormal noises associated with the defect include those caused by bearing anomaly, internal abnormal contact, unbalance, and intrusion of foreign body. Specifically, the abnormal noises include those due to lack of gearing, which generated at a frequency of each one turn of the gear, bite of a foreign body, spot flaw, and momentary rubbing between a rotating portion and a stationary portion of the motor during rotation. The human can hear the sound ranging from about 20 Hz to about 20 kHz. The human feels uncomfortable by the sound of about 15 kHz. The sound in which such a specific frequency component is generated is also felt to coincide with abnormal noise. Obviously though, the abnormal noises are not limited to the frequency of about 15 kHz.

Not only is the sound associated with the defect uncomfortable, but also, the sound possibly indicates the lead-in to another failure. Therefore, the presence or absence of the abnormal noises is detected for the purpose of quality assurance for each product. In a manufacturing plant, an examiner usually performs "sensory inspection" by five senses, usually hearing and touch. Specifically, the examiner hears the sound or confirms vibration by touch. The sensory inspection is defined by sensory inspection terminology JIS Z8144.

Skilled performance is required in the sensory inspection with the five senses of the examiner. The result of the sensory inspection heavily depends on individual examiners and varies with time. Furthermore, it is difficult to convert the result of the sensory inspection into data or a numerical value, which results in a difficulty in managing the sensory inspection. In order to solve the problem, an abnormal noise inspection apparatus is used as the inspection apparatus, which inspects the anomaly of the product including drive-system components. The purpose of the abnormal noise inspection apparatus is to conduct stable inspection with quantitative and clear criteria.

In the conventional abnormal noise inspection apparatus, a high-performance discrimination algorithm is produced and improved in order that an over-detection rate is reduced while occurrence of an undetected error rate is eliminated. As used herein, the "undetected error" shall mean that a defective product (abnormal product) is discriminated as an acceptable product (normal product). It is necessary to surely prevent the undetected error, because otherwise the defective product will be shipped. The "over-detection" shall mean that the acceptable product is discriminated as the defective product. In the over-detection, the acceptable product will not be shipped and instead will be scrapped, which means that the acceptable product is wasted and a yield is decreased. Therefore, the number of characteristic values used is increased, and the number of samples necessary for producing a better discrimination rule is increased.

Recently, consumers have become more strict with the quality of the industrial product. In the era of high-mix low-volume production, not only the quality of the product needs to be ensured, but also, a production line must be established as soon as possible. That is, it is not sufficient only to achieve the higher accuracy of the abnormal noise inspection algorithm. There are two needs in a production site in order to ship higher quality products.

First one is to automatize the inspection. Usually, in the inspection for measuring a size or a weight of the product in a production process, a management criterion is determined for each characteristic of the product to manage the quality. For example, a plurality of quality characteristics are extracted from an image or a waveform in the inspection apparatus in which the sensory inspection such as solder appearance inspection of a printed wiring board and the abnormal noise inspection of the automobile engine is automatized. Then, a discrimination model makes a determination in a comprehensive manner.

Second one is vertical start-up. Usually, the mass production line is started up after mass production trial. In the mass production trial, a product is produced to check whether or not any problem exists in the processes by the same production means as the mass production after research and design. In automatically producing a discrimination model for an automatic inspection apparatus, the modeling cannot be performed unless sufficient data is collected. Therefore, the inspection criterion cannot be fixed until the mass production is started. In order to realize the vertical start-up of the production line, it is necessary that the inspection criterion used in the mass production phase is determined in the mass production trial phase to simultaneously start the stable inspection with the start of the mass production.

In the sensory inspection, the discrimination is performed in a comprehensive manner on the quality characteristics such as volume and pitch of the sound, an appearance color, and a shape. Pattern recognition is effectively used in the sensory inspection automation system. In the pattern recognition, a plurality of characteristic values indicating the quality characteristics are extracted from the data obtained by a sensor such as a microphone and a camera, and the discrimination is made by a discrimination function. Generally, in the pattern recognition, it is necessary that a sufficient number of learning samples be prepared to determine the discrimination function.

Next, a product inspection by the pattern recognition will be described.

FIG. 24 shows a procedure of the pattern recognition. The pattern recognition is a technique of determining (discriminating) a group to which the data belongs based on the pattern of the characteristic value extracted from the data. Therefore, in the pattern recognition, it is necessary that the discrimination function on the pattern space be previously automatically generated (learned) from the data that has been already observed or measured.

The pattern recognition technique can be classified into four types according to distribution expression and distribution symmetry.

The distribution expression can be classified into "parametric discrimination" and "non-parametric discrimination".

The distribution is expressed by a statistical parameter in the parametric discrimination while the distribution is not expressed by the statistical parameter in the non-parametric discrimination.

The distribution symmetry can be classified into "two-class discrimination model" and "one-class discrimination model". In the two-class discrimination model, it is assumed that the distribution symmetry holds. In the one-class discrimination model, it is not assumed that the distribution symmetry holds.

Specifically, during the learning phase, in the parametric discrimination, a parameter is estimated for regulating a shape of a probability density distribution (for example, average and dispersion) followed by data belonging to each group for a plurality of groups (for example, normal and abnormal) formed by the pieces of data that have been already observed. When new data is observed in the discrimination phase, a degree of attribution to each group is determined using the estimated parameter, and the group to which the data belongs is determined. The parametric discrimination is an effective technique only in the case where it can be assumed that the data follows the probability density distribution (for example, normal distribution) whose shape can be regulated by the parameter.

During the learning phase, in the non-parametric discrimination, all the pieces data that have been already observed or part of data contributing to the discrimination are retained in each group. Alternatively, in the non-parametric discrimination, the density distribution is directly determined from the data without using the statistical parameter. When new data is observed during the discrimination phase, the degree of attribution to each group is determined from the retained data, or similarity or a distance to the distribution, and the group to which the new data should belong is determined. The non-parametric discrimination is the effective technique even if it cannot be assumed that the data follows the probability density distribution whose shape can be regulated by the parameter.

On the other hand, during the learning phase, in the two-class discrimination, the discrimination function is learned using the samples of the two classes (for example, acceptable product and defective product) to be discriminated. During the discrimination phase, the degree of attribution of the unknown sample to each class is determined by the discrimination function to compare and evaluate to which class the data is more likely to belong.

During the learning phase, in the one-class discrimination, the density estimation is performed using only the one-class learning sample. During the discrimination phase, the degree of attribution of the unknown sample is determined by the discrimination function based on the density. Then, threshold determination is made in such a manner that the unknown sample is determined to belong to the class when the degree of attribution of the unknown sample is not lower than a predetermined value and the unknown sample is determined not to belong to the class when the degree of attribution of the unknown sample is lower than the predetermined value.

For example, the pattern recognition has the following four categories:

(1) Parametric two-class discrimination: Bayes discrimination and discrimination analysis;

(2) Non-parametric two-class discrimination: nearest neighbor discriminator (NN discriminator) and support vector machine (SVM);

(3) Parametric one-class discrimination: Mahalanobis-Taguchi system (MTS); and (4) Non-parametric one-class discrimination: histogram method, nearest neighbor estimation, one-class SVM, Parzen window method, RBF (Radial Basis Function) network, kernel density estimation, and boostrap method.

The acceptable product is homogeneous, while the defective product has a wide variety. Therefore, the usual two-class discrimination in which it is assumed that the distribution has the symmetry on the feature space of each class is not suitable for the discrimination between the acceptable product and the defective product. The number of defective product samples which can be collected in the product inspection is extremely small compared with the acceptable product sample. Therefore, the one-class discrimination in which only the acceptable product distribution is considered is effectively used in the discrimination between the acceptable product and the defective product.

It is necessary that the inspection be started simultaneously with the start of the mass production. That is, it is necessary that the discrimination function for discriminating the acceptable product from the defective product be determined from the restricted number of samples obtained before the mass production. Sufficient acceptable product samples, however, are also not obtained before the start of the mass production. In the parametric discrimination in which the statistical estimation is required, the satisfactory performance cannot be ensured with the small number of samples. Therefore, the non-parametric discrimination in which the statistical estimation is not required is effectively used in the case where the discrimination function is determined from the restricted number of samples.

Thus, the non-parametric one-class discrimination is effectively used in the pattern recognition to be applied to the product inspection.

The following techniques are cited herein as examples of the conventional inspection apparatuses.

In the parametric discrimination, it is impossible to perform the learning with the small number of samples, or it is difficult to ensure the discrimination performance with the small number of samples. For example, in MTS, the (accuracy multicollinearity) learning cannot be performed when the number of learning samples is not more than the number of feature points. Even if the number of learning samples is more than the number of feature points, sometimes the discrimination performance cannot be ensured because the small number of samples is not sufficient to assure the accuracy of the statistical estimation. Therefore, in order to ensure the performance, empirically, it is necessary that the number of samples be approximately three times larger than the number of feature point. Hiroshi Tazaki, Kazuto Kasuya, and Hiroshi Nakajima, "Progressive discrimination model update method for automatic inspection," 32nd Intelligent System Symposium Proceedings, pp. 243-246 (2005) discloses a method in which the performance is ensured by the use of the non-parametric discrimination or by the simultaneous use of the non-parametric discrimination in the case where the number of samples is small.

Nello Cristianini, John Shawe-Taylor, "An Introduction to Support Vector Machines: And Other Kernel-Based Learning Methods," Cambridge University Press (2000) discloses a method in which, in the one-class SVM, a parameter is adjusted to minimize the number of support vectors by utilizing a nature that a ratio of the support vector becomes an upper limit of an error rate evaluated by a leave-one-out method. However, in the method, the problem that the acceptable area is possibly divided into a plurality of areas is not solved because the shape of the area is not evaluated.

Asa Ben-Hur, David Horn, Hava T. Siegelmann, Vladimir Vapnik, "Support Vector Clustering," Journal of Machine Learning Research 2, pp. 125-137 (2001) discloses a method in which clustering is performed to the learning samples belonging to the same area by determining whether or not a line segment connecting the learning sample discriminated as the acceptable product deviates from the acceptable area for all combinations of the learning samples. As shown in FIG. 25, the sample belonging to the same cluster can be known by producing a matrix (FIGS. 25B and 25D) in which the presence or absence of the deviation is expressed by zero or one. FIG. 25B shows the matrix in the single acceptable area (FIG. 25A) and FIG. 25D shows the matrix in the two acceptable areas (FIG. 25C).

Basically, a quality characteristic of a product has a variation (caused by a variation of component and material or a fluctuation of manufacturing apparatus) around the center of a target value. Therefore, it is believed that an area (true acceptable area) where the acceptable product is generated forms a single area centering on target value (FIG. 26A).

The discrimination function obtained by the learning from the limited samples actually forms the acceptable area (learned acceptable area) which is different from the true acceptable area. As a difference between the actual acceptable area and the true acceptable area is decreased, the discrimination performance becomes better (FIG. 26B).

Usually, in the non-parametric discrimination, the acceptable area is determined based on density of the learning samples. When a coarse portion exists in the learning samples, the acceptable area is possibly divided into a plurality of areas (FIG. 27A). In the case where the number of the learning samples is small, the learning samples become possibly coarse even in a portion in which the learning samples originally have high density. That is, a risk of largely lowering the discrimination performance occurs.

When the acceptable area is single (FIG. 27B), it is thought that the actual acceptable area is brought closer to the true acceptable area when compared with the case in which the acceptable area is divided. In such cases, it is expected that the discrimination performance is improved. Therefore, after the learning, it is determined whether or not the discrimination function forms the single acceptable area, and the parameter may be adjusted such that the acceptable area becomes single.

SUMMARY

An inspection apparatus according to a first aspect of one or more embodiments of the present invention includes a discrimination function determination unit which determines whether or not a discrimination function used in non-parametric one-class discrimination forms an area including a sample to be discriminated into a class as a single area in an input space where samples are plotted.

In the inspection method according to the first aspect of one or more embodiments of the present invention performed by an inspection apparatus which decides a discrimination function used to discriminate a state of an inspection target, the inspection method includes a step in which a discrimination function determination unit included in the inspection apparatus determines whether or not a discrimination function used in non-parametric one-class discrimination forms an area including a sample to be discriminated into a class as a single area in an input space where samples are plotted.

An inspection apparatus according to a second aspect of one or more embodiments of the present invention includes a parameter setting unit which sets an area parameter such that the discrimination function forms the single area in the input space where samples are plotted, when the discrimination function determination unit determines that the discrimination function does not form the single area, the area parameter regulating a size of an area of a basis function, the basis function regulating the discrimination function, the basis function becoming a basis of a density function.

In the inspection method according to the second aspect of one or more embodiments of the present invention performed by an inspection apparatus which decides a discrimination function used to discriminate a state of an inspection target, the inspection method includes a step in which a parameter setting unit included in the inspection apparatus sets an area parameter such that the discrimination function forms an area including a sample to be discriminated into a class as a single area in the input space where samples are plotted, when the discrimination function determination unit determines that the discrimination function does not form the single area, the area parameter regulating a size of an area of a basis function, the basis function regulating the discrimination function used in non-parametric one-class discrimination, the basis function becoming a basis of a density function.

BRIEF DESCRIPTION OF THE DRAWINGS

FIG. 8 shows an example of line segments, generated by an acceptable area number determination unit of the discrimination function decision unit of FIG. 1, which connect learning samples discriminated as the acceptable product.

FIG. 9 shows an example of line segments, generated by an acceptable area number determination unit of the discrimination function decision unit of FIG. 1, which connect a center (mean) of learning samples discriminated as the acceptable product and the learning samples discriminated as the acceptable product.

FIG. 10 shows an example of line segments, generated by an acceptable area number determination unit of the discrimination function decision unit of FIG. 1, which connect margin support vectors (MSV) in SVM.

FIG. 11 shows an example of line segments, generated by an acceptable area number determination unit of the discrimination function decision unit of FIG. 1, which connect a center (mean) of the learning samples discriminated as the acceptable product with margin support vectors in SVM.

FIG. 12 shows an example when the acceptable area is single.

FIG. 13 shows a change in size of the acceptable area depending on a volume V of a hypercube of a histogram method.

FIG. 14 shows a change in size of the acceptable area depending on a radius r of a hypersphere of nearest neighbor estimation.

FIG. 15 shows a change in size of the acceptable area depending on a width a of Gaussian kernel of a one-class SVM.

FIG. 16 shows data used in the discrimination function decision unit of FIG. 1, FIG. 16A shows a learning sample, FIG. 16B shows a parameter candidate, and FIG. 16C shows a discrimination function;

FIG. 20 shows a flowchart of a procedure of confirming that a discrimination function of the discrimination function decision unit of FIG. 1 is not lower than a threshold.

FIG. 21 shows a specific example of data generated in extracting a point from the line segment in the acceptable area number determination process performed by the discrimination function decision unit of FIG. 1, FIG. 21A shows the case in which five points including both ends are extracted to register coordinates, FIG. 21B shows the case in which data registration is omitted for both ends of the line segment, and FIG. 21C shows the case in which one end of the line segment is the center of a learning sample discriminated as the acceptable product;

FIG. 23 shows a flowchart of a procedure of confirming that the minimum value is not lower than a threshold in the acceptable area number determination process performed by the discrimination function decision unit of FIG. 1.

FIG. 26 shows an acceptable area and a defective area, FIG. 27 shows the number of acceptable areas.

DETAILED DESCRIPTION

Embodiments of the present invention will be described below with reference to the drawings.

Figure 1:
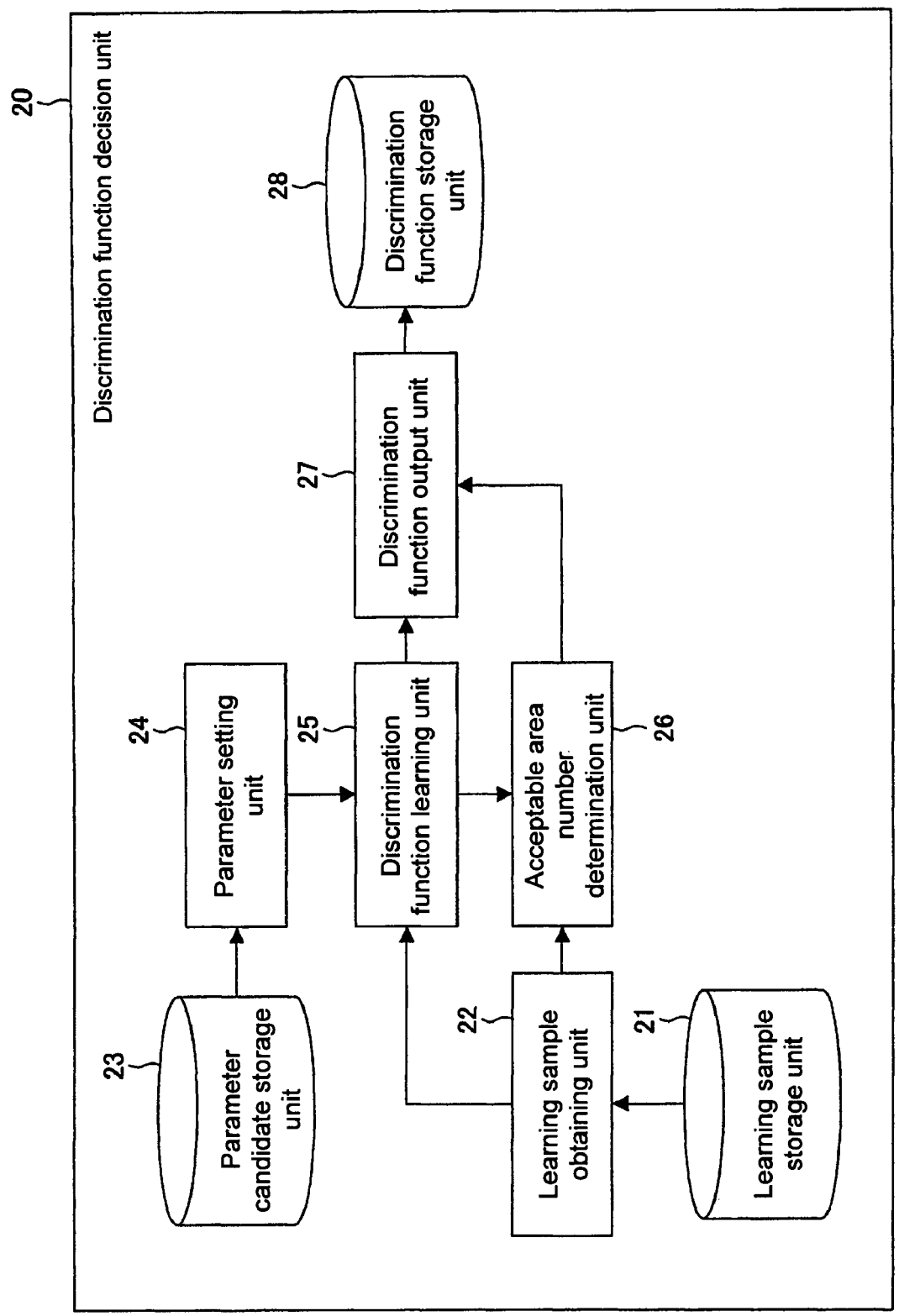
FIG. 1 shows a functional block diagram of a configuration of a discrimination function decision unit included in an inspection apparatus according to an embodiment of the present invention.
Figure 2:
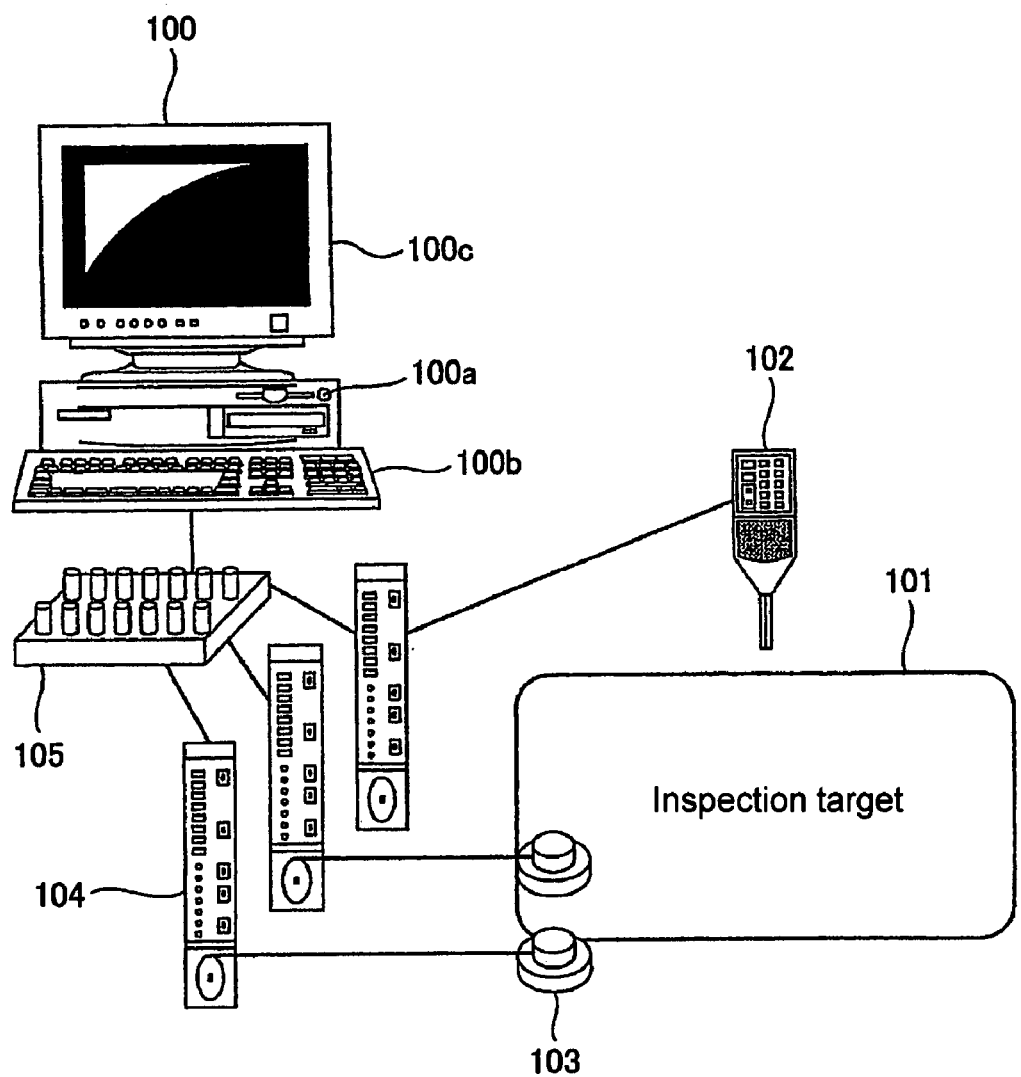
FIG. 2 shows a schematic configuration of an inspection apparatus according to an embodiment of the present invention.

FIG. 2 shows a schematic configuration of the inspection apparatus 100 according to one or more embodiments of the present invention. FIG. 1 shows a functional block diagram of a configuration of a discrimination function decision unit 20 included in the inspection apparatus 100.

The inspection apparatus 100 extracts a characteristic value from inputted measurement data of an inspection target. On the basis of the extracted characteristic value, the inspection apparatus 100 discriminates the acceptable sample from the defective sample by the non-parametric one-class discrimination. The inspection apparatus 100 includes the discrimination function decision unit 20. The discrimination function decision unit 20 has the following functions: (1) A function of determining whether or not the discrimination function used in the non-parametric one-class discrimination forms a single acceptable area (an area including learning samples discriminated as a class (acceptable product): area including more learning samples); and (2) A function of setting an area parameter such that the discrimination function forms the single acceptable area, the area parameter regulates a size of an area of a basis function, the basis function regulates the discrimination function used in the non-parametric one-class discrimination, and the basis function becomes a basis of a density function.

In the following description, a functional outline of the discrimination function decision unit 20 is described, and then an apparatus configuration thereof is described.

[Outline]

(1) Basic Concept of Non-Parametric One-Class Discrimination

The non-parametric one-class discrimination is a technique in which density of learning samples is estimated without using a statistical parameter, to discriminate an acceptable product whose density is not lower than a predetermined threshold from a defective product whose density is lower than the predetermined threshold. Examples of the specific discrimination algorithm include a histogram method, nearest neighbor estimation, a one-class support vector machine (SVM), a Parzen window method, an RBF network, kernel density estimation, and a boostrap method. The histogram method, the nearest neighbor estimation, and the one-class support vector machine (SVM) will be described below.

(a) Histogram Method

Figure 3:
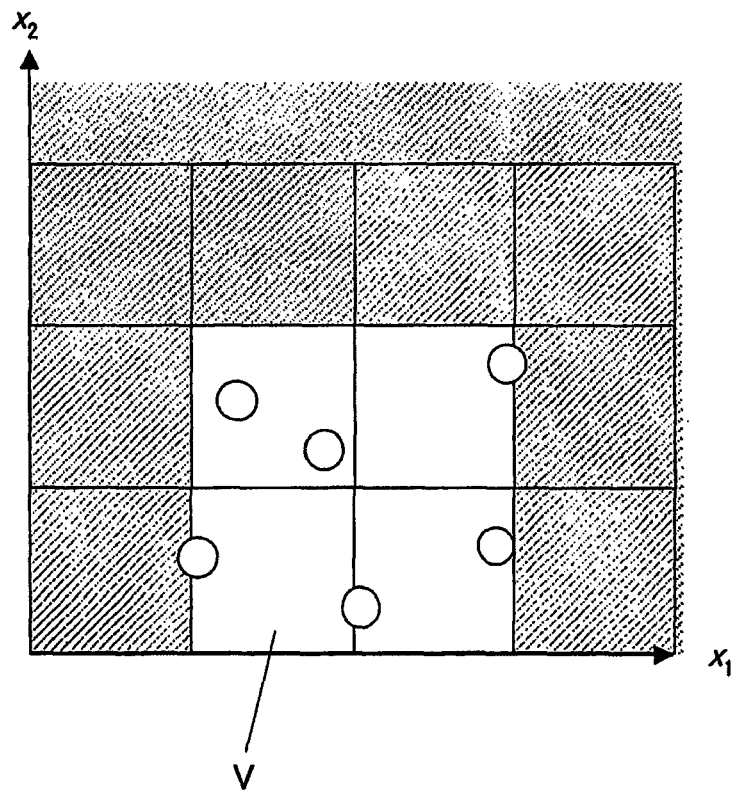
FIG. 3 shows a histogram method which is an example of a non-parametric one-class discrimination.

FIG. 3 shows the histogram method. FIG. 3 shows the case in which at least one learning sample is set to the acceptable area. In FIG. 3, a circle indicates a sample, and one section indicates a hyperbox having a volume V.

In the histogram method, the input space is divided into the hyperboxes having the volumes V, and the number of included samples is counted to estimate the density. In the histogram method, the acceptable area where the number of included samples is not lower than a predetermined threshold is discriminated from the defective area (shaded portion of FIG. 3) where the number of included samples is lower than the predetermined threshold.

(b) Nearest Neighbor Estimation

Figure 4:
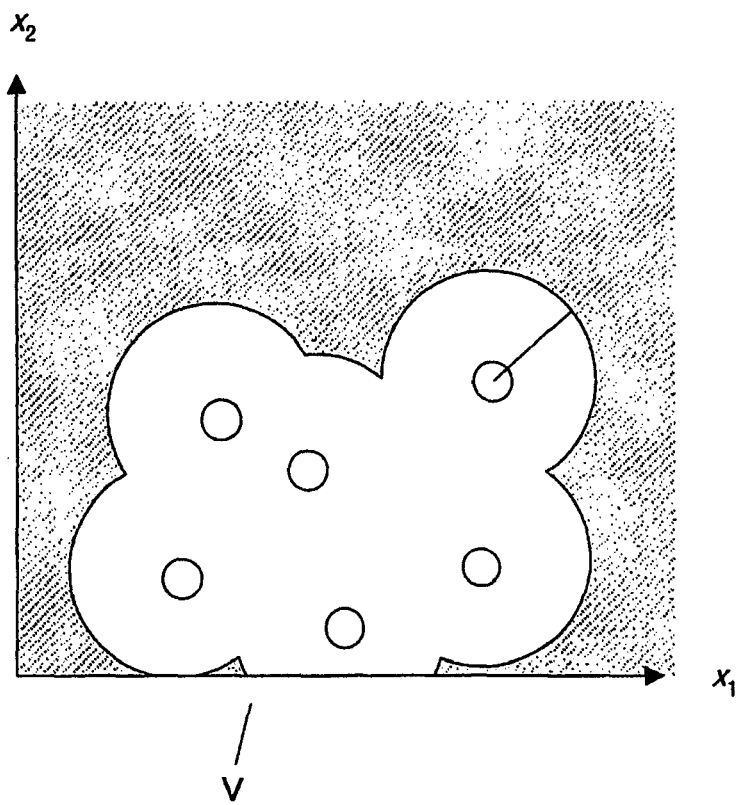
FIG. 4 shows nearest neighbor estimation which is an example of the non-parametric one-class discrimination.

FIG. 4 shows the nearest neighbor estimation. In FIG. 4, a circle indicates a sample, and an arc indicates a hypersphere having a radius r centered on the sample.

In the nearest neighbor estimation, the acceptable area which is included in the hypersphere having the radius r centered on the learning sample is discriminated from the defective area (shaded portion of FIG. 4) which is not included in the hypersphere.

(c) One-Class SVM

Figure 5:
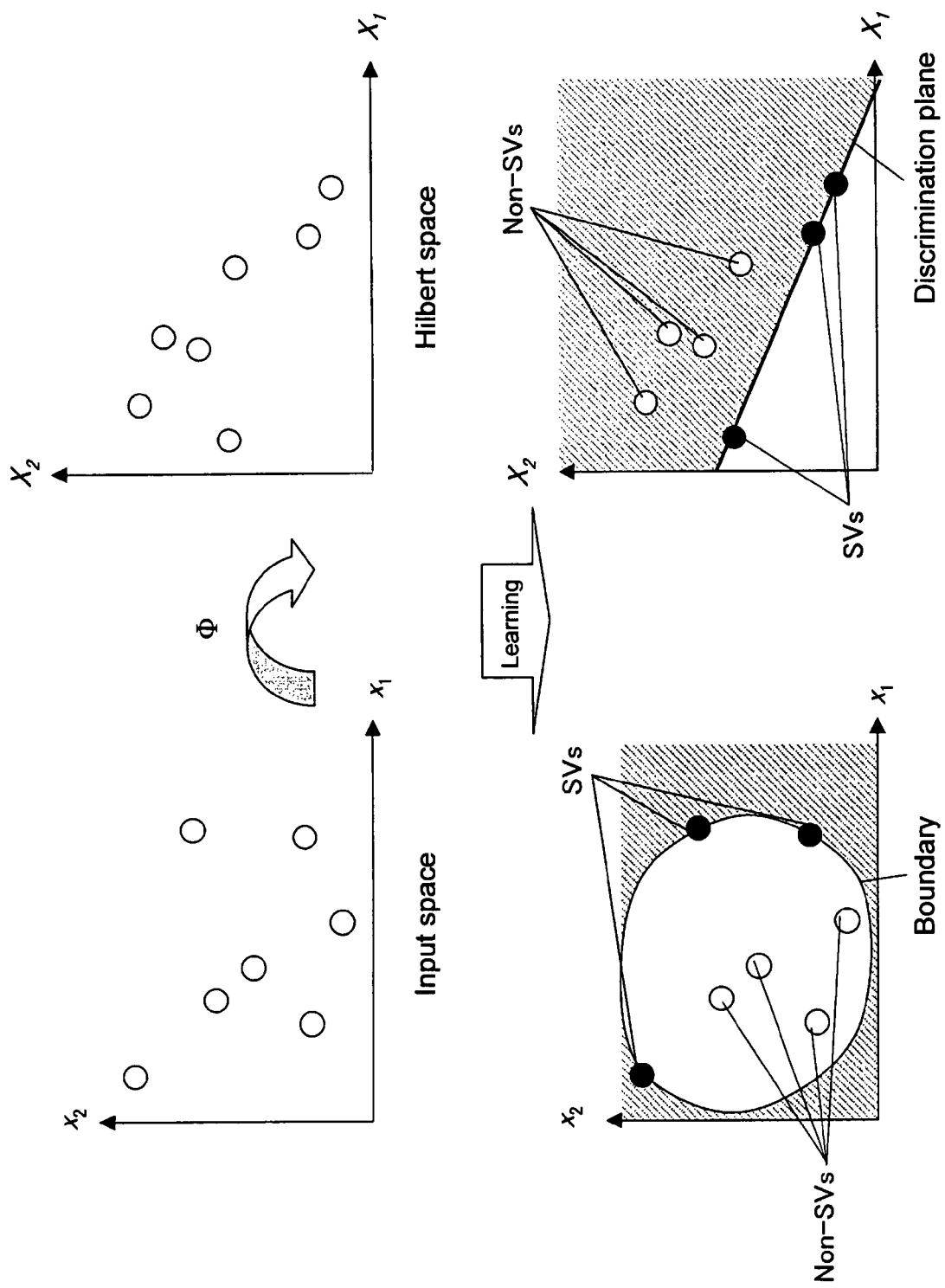
FIG. 5 shows a one-class SVM which is an example of the non-parametric one-class discrimination.

FIG. 5 shows the one-class SVM. The left side of FIG. 5 shows the input space which is an original space, and the right side of FIG. 5 shows a multi high-dimensional Hilbert space in which the input space is mapped by non-linear mapping Φ. A circle indicates a sample. In the lower side of FIG. 5, the sample on the discrimination plane determined by the post-learning Hilbert space is a support vector (SV), and other samples are a non-support vector (Non-SV). A boundary is one in which the discrimination plane of the Hilbert space is inversely transformed into the input space. In the one-class SVM, the acceptable area within the boundary is discriminated from the defective area (shaded portion of FIG. 5) out of the boundary.

Specifically, in the one-class SVM, the learning samples on the input space is mapped in the multi high-dimensional Hilbert space by the non-linear mapping Φ, and the linear discrimination plane is learned.

Kernel mapping in which Gaussian kernel is used has a feature that the learning sample located in the input space having the low density is mapped near an origin, while the learning sample located in the input space having the high density is mapped far away from the origin.

$$K(x, z) = \exp\left(-\frac{\|x-z\|^2}{2\sigma^2}\right) \quad \text{[Equation 1]}$$

The one-class SVM learns a hyperplane (i.e., discrimination plane) located farthest away from the origin in the hyperplanes which separates the origin and the learning sample on the Hilbert space. The learning sample on the hyperplane is referred to as support vector.

At this point, assuming that the learning sample is a set of n dth-dimensional vectors x={x1, ..., xd}, the discrimination function by the one-class SVM is expressed by the following equation 2. When a function value is not lower than zero, it is determined that the learning sample is the acceptable product. When the function value is lower than zero, it is determined that the learning sample is the defective product.

$$f(x) = \sum_i (\alpha_i K(x_i, x)) - \rho \quad \text{[Equation 2]}$$

In the equation 2, xi is a label of the learning sample. αi is a coefficient called the weight of the support vector, and is determined through the learning. ρ is a constant determined by substituting an arbitrary support vector xi (learning sample having the coefficient αi≠0) to the following equation 3.

$$f(x) = \sum_i (\alpha_i K(x_i, x)) - \rho \quad \text{[Equation 3]}$$

Generally, it is difficult to learn the non-linear discrimination plane on the input space. When the linear discrimination plane is obtained by mapping the non-linear discrimination plane on the high-dimensional space, it is easy to learn the non-linear discrimination plane on the high-dimensional space using a linear discrimination algorithm. SVM is the linear discrimination algorithm. In order to learn the linear discrimination plane, it is necessary to calculate an inner product of two vectors. Therefore, instead of learning directly the non-linear discrimination plane in the input space, the linear discrimination plane is learned in the high-dimensional space using SVM here. A function expressing the inner product of the two vectors on the high-dimensional space with the two vectors on the input space is referred to as "kernel function". In the kernel function, it is easy to learn the non-linear discrimination plane without performing the calculation in the high-dimensional space. The method of replacing the calculation in the high-dimensional space with the kernel function calculation is referred to as kernel trick.

(Soft Margin in One-Class SVM)

Figure 6A:
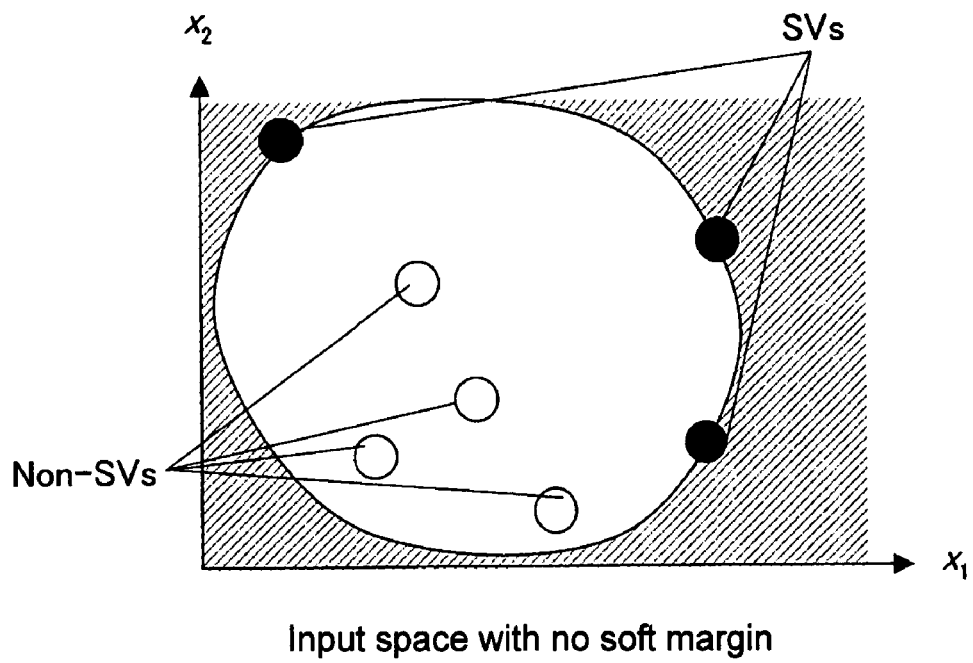
FIG. 6A shows an input space with no soft margin.
Figure 6B:
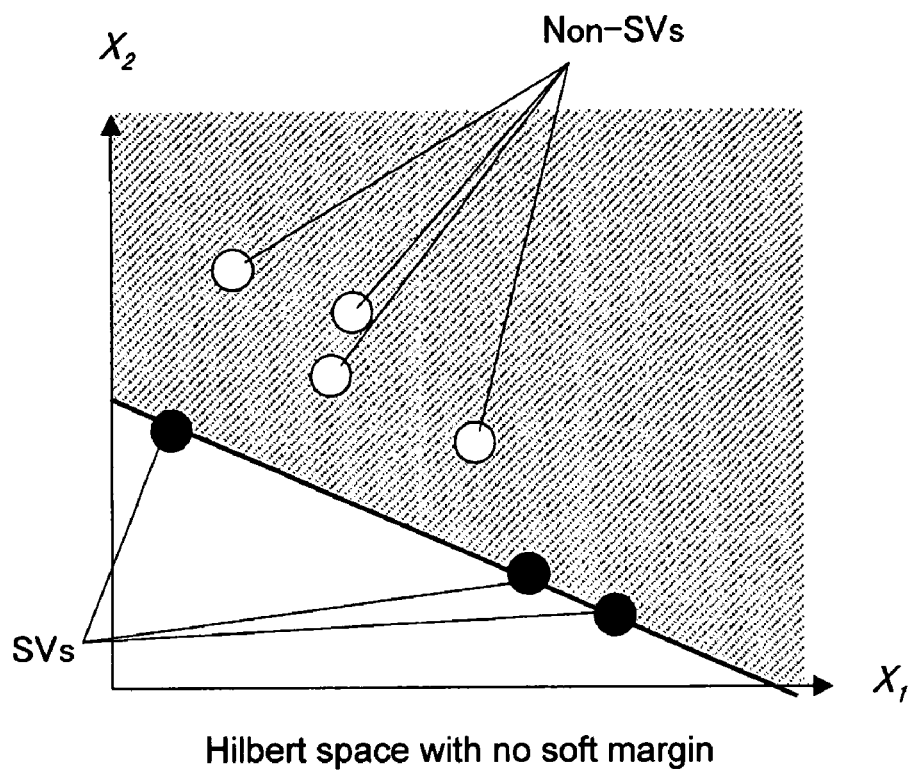
FIG. 6B shows a Hilbert space with no soft margin.
Figure 7A:
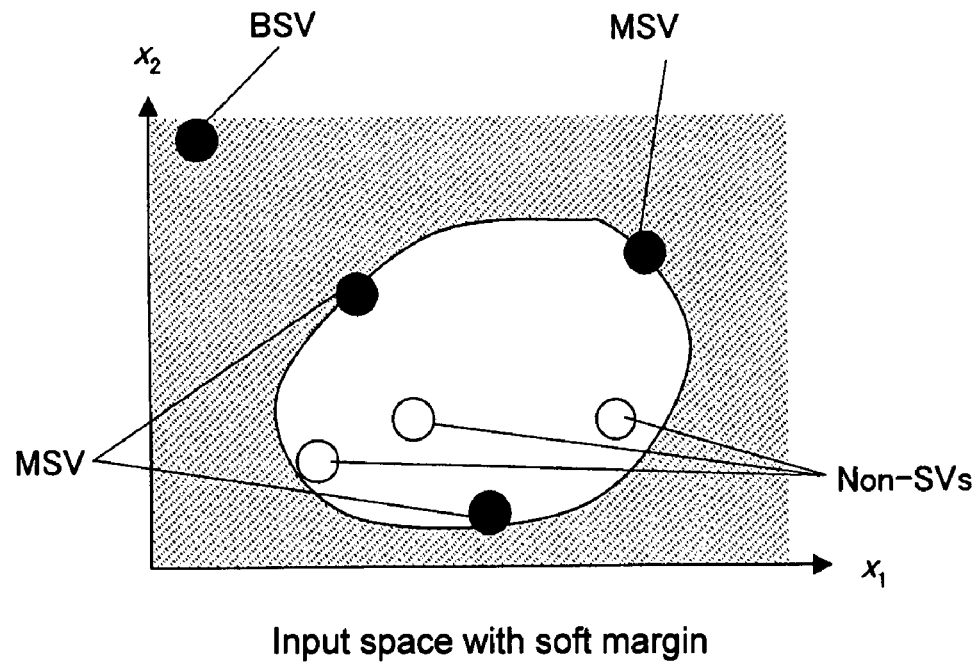
FIG. 7A shows an input space with a soft margin.
Figure 7B:
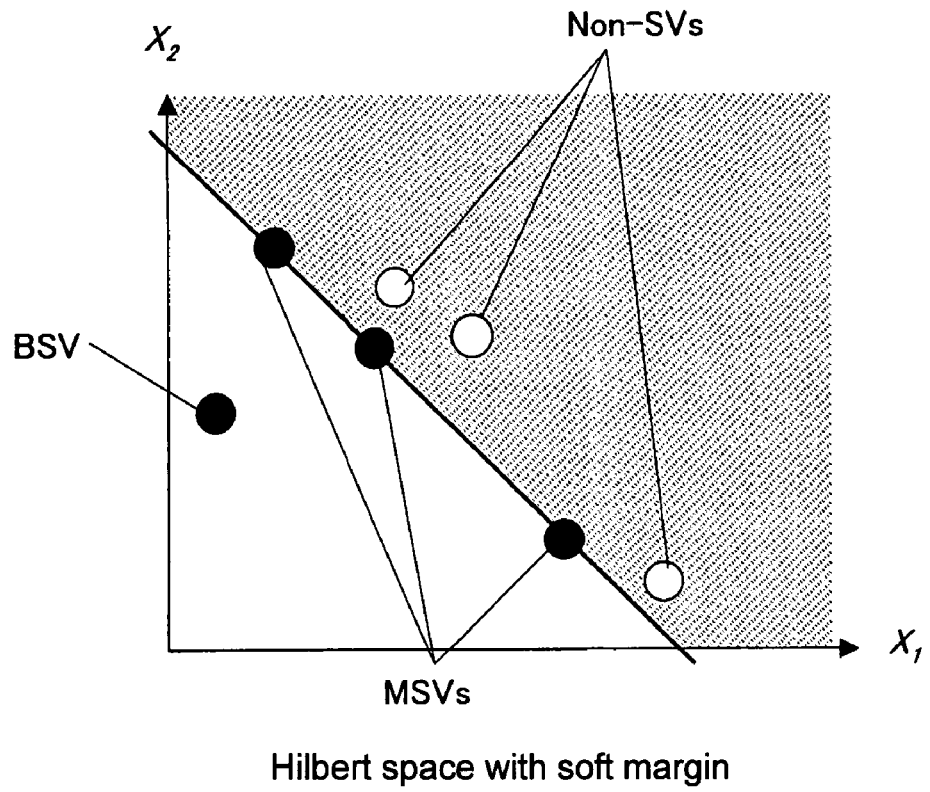
FIG. 7B shows a Hilbert space with a soft margin.

FIG. 6A shows an input space with no soft margin, and FIG. 6B shows a Hilbert space with no soft margin. FIG. 7A shows the input space with the soft margin, and FIG. 7B shows the Hilbert space with the soft margin.

Usually, the one-class SVM performs the learning such that no learning sample is left on the origin side in the discrimination plane (hard margin). However, in the one-class SVM, when the learning sample includes an outlier, there is a problem that the discrimination performance is lowered due to over-conformity. Therefore, the over-conformity for the outlier can be avoided by permitting the learning samples to be left on the origin side in the discrimination plane to a predetermined fraction.

In the soft margin, a fraction v which permits the learning samples to be left on the origin side is introduced in the learning algorithm, and the discrimination function of the learning result is expressed in the same form as the hard margin. In the soft margin, not only the learning samples on the discrimination plane but also the learning samples left on the origin side are referred to as support vector. Therefore, when the learning samples on the discrimination plane is discriminated from the learning samples left on the origin side, it is assumed that the former is referred to as margin support vector (MSV; sample on the discrimination plane to be stored in the model) and the latter is referred to as bounded support vector (BSV).

(2) Determination of Single Acceptable Area

In the case where the acceptable area is not single, i.e., in the case of a plurality of acceptable areas, the line segment which deviates from the acceptable area always exists. Therefore, for example, one of the line segments (i) to (iv) is drawn to determine whether or not the point on the line segment deviates from the acceptable area. The line segment is not limited to the four kinds of the line segments (i) to (iv), but any line segment may be used as long as the line segment has a part which deviates from the acceptable area in the case of a plurality of acceptable areas.

Figure 8A:
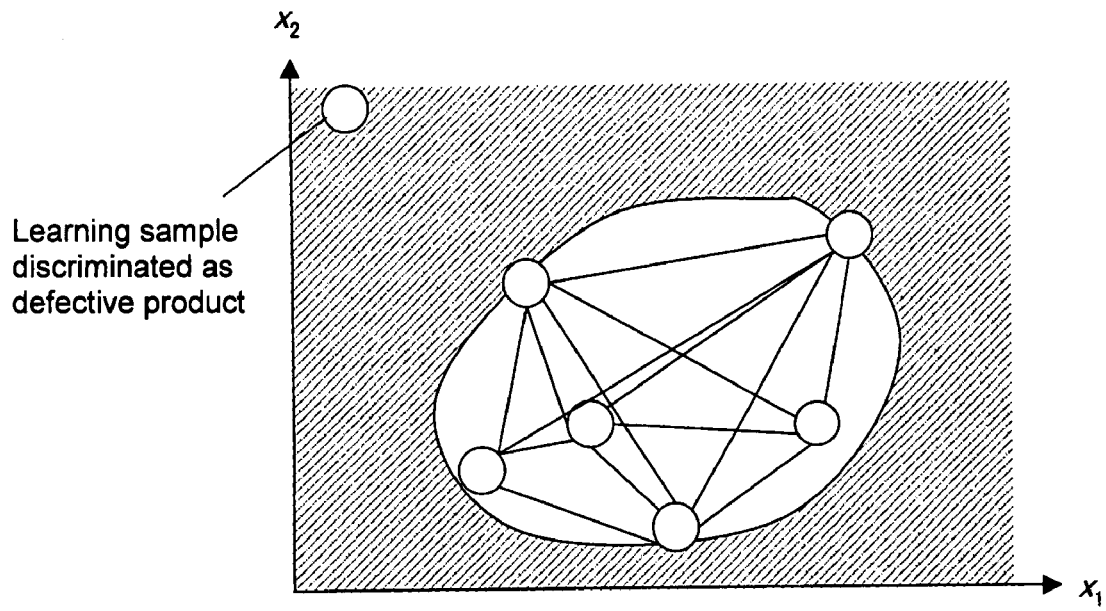
FIG. 8A shows the single acceptable area.
Figure 8B:
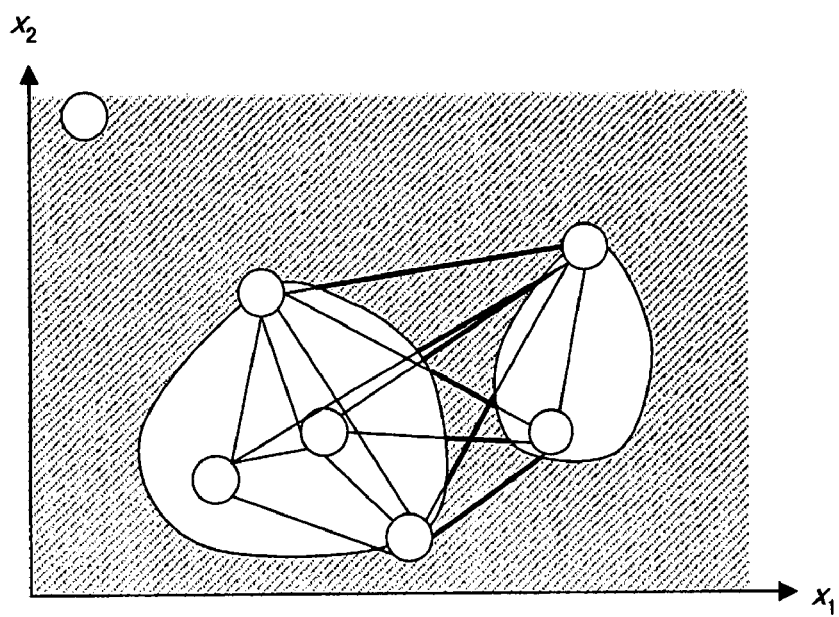
FIG. 8B shows the two acceptable areas.

(i) A line segment connecting the learning samples discriminated as the acceptable product (FIGS. 8A and 8B)

Figure 9A:
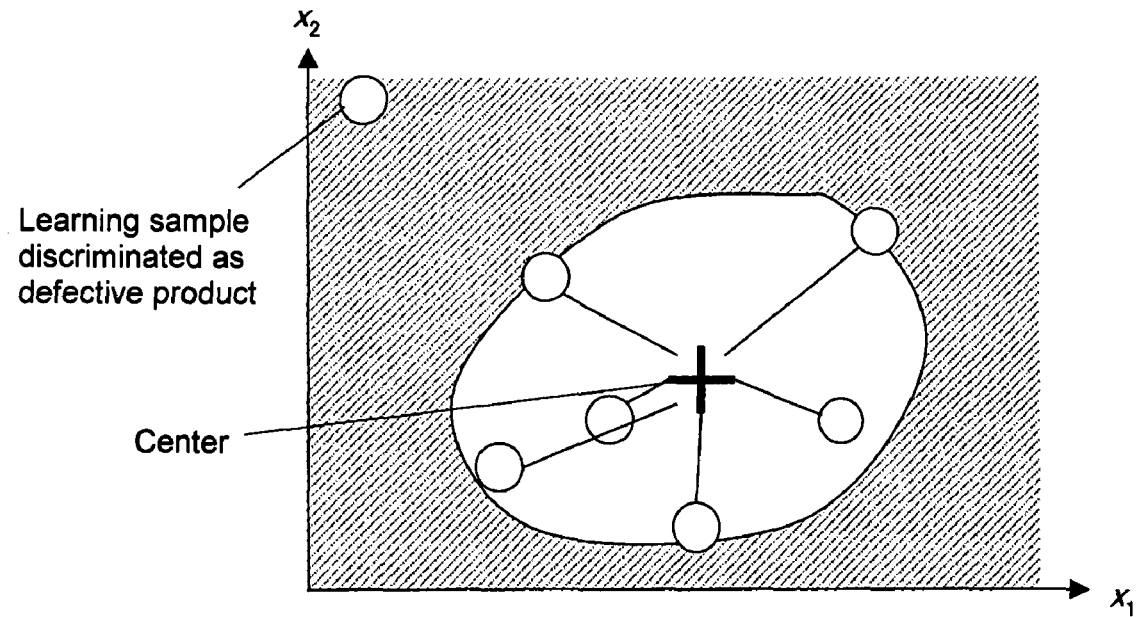
FIG. 9A shows the single acceptable area.
Figure 9B:
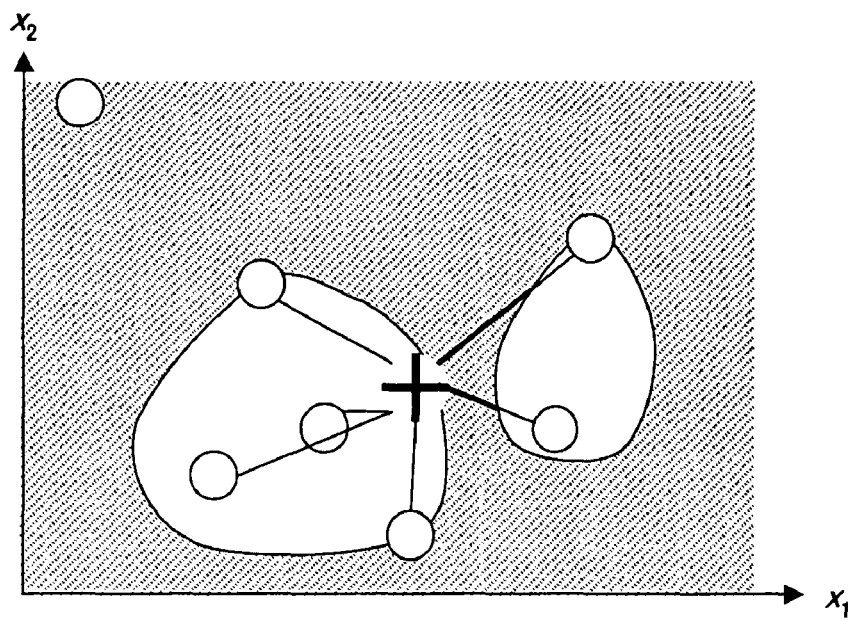
FIG. 9B shows the two acceptable areas.

(ii) A line segment connecting the center (mean) of the learning samples discriminated as the acceptable product and the learning sample discriminated as the acceptable product (FIGS. 9A and 9B)

Figure 10A:
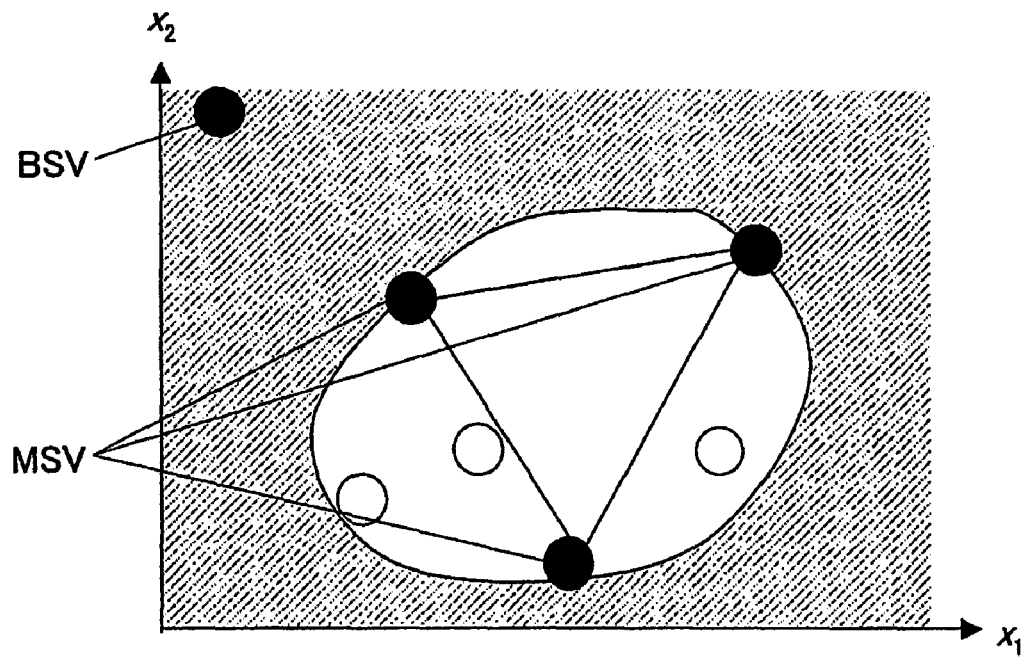
FIG. 10A shows the single acceptable area.
Figure 10B:
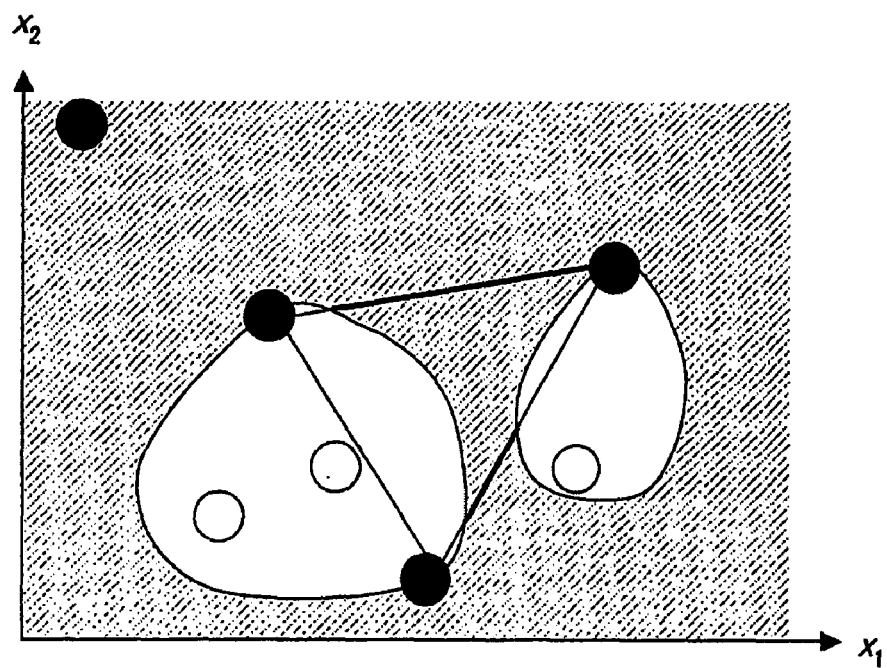
FIG. 10B shows the two acceptable areas.

(iii) For example, in the case of SVM, a line segment connecting the margin support vectors (MSV) (FIGS. 10A and 10B)

Figure 11A:
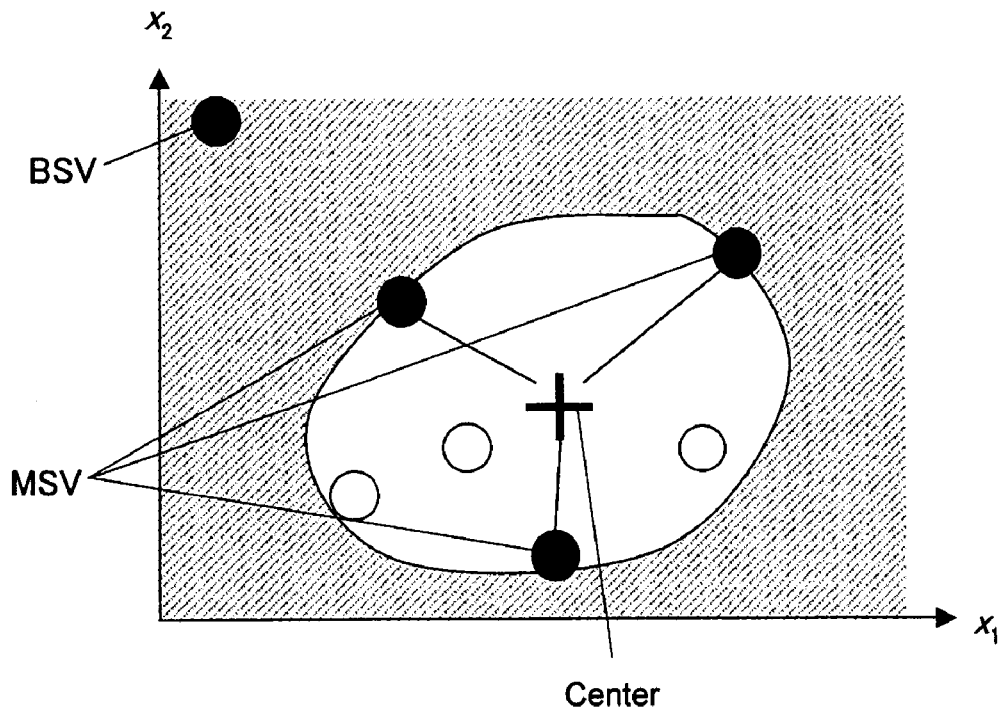
FIG. 11A shows the single acceptable area.
Figure 11B:
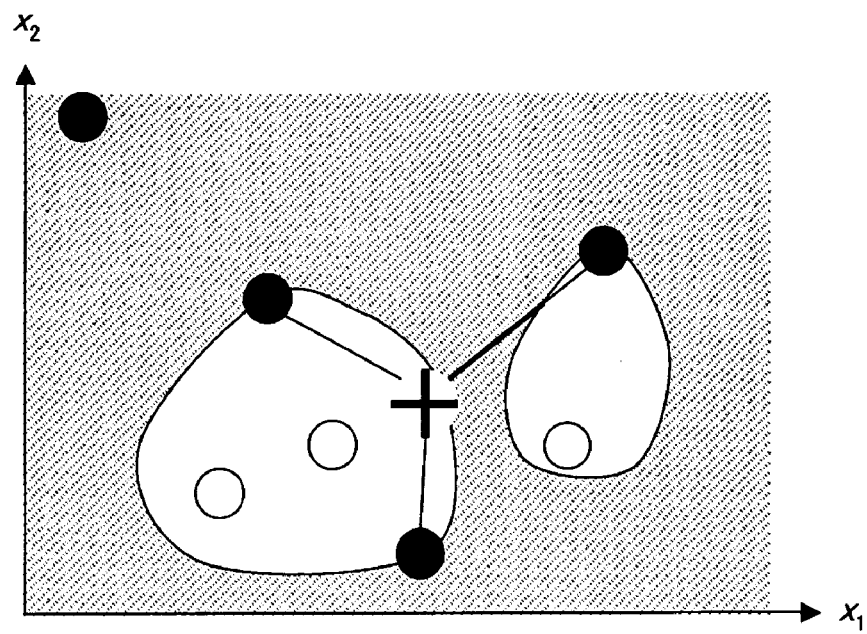
FIG. 11B shows the two acceptable areas.

(iv) For example, in the case of SVM, a line segment connecting the center (mean) of the learning samples discriminated as the acceptable product and the margin support vector (FIGS. 11A and 11B)

FIGS. 8 to 11 show the line segments (i) to (iv). Each part A of FIGS. 8 to 11 shows the single acceptable area, and each part B of FIGS. 8 to 11 shows the two acceptable areas. A bold line part of the line segment in each part B shows the portion which deviates from the acceptable area.

The determination whether or not the point on the line segment deviates from the acceptable area may be made as follows: (1) It is confirmed that the discrimination function is not lower than the threshold for a plurality of points extracted from the line segment; and (2) The minimum value of the discrimination function is determined on the line segment by the optimizing technique, and it is confirmed that the minimum value is not lower than the threshold (sometimes the maximum and the minimum values are reversed depending on the function).

Figure 12A:
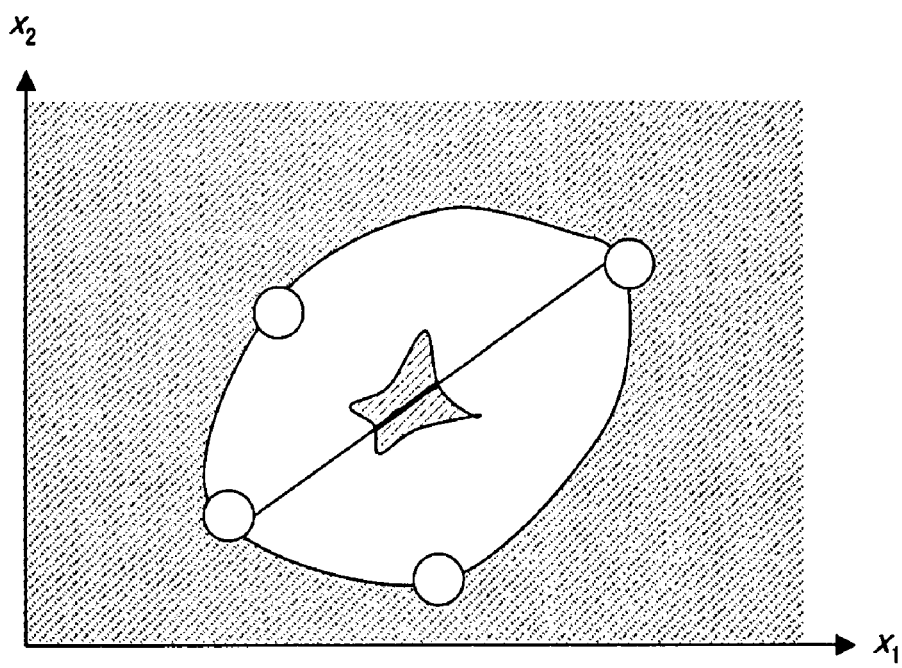
FIG. 12A shows the case in which a hole exists in the acceptable area.
Figure 12B:
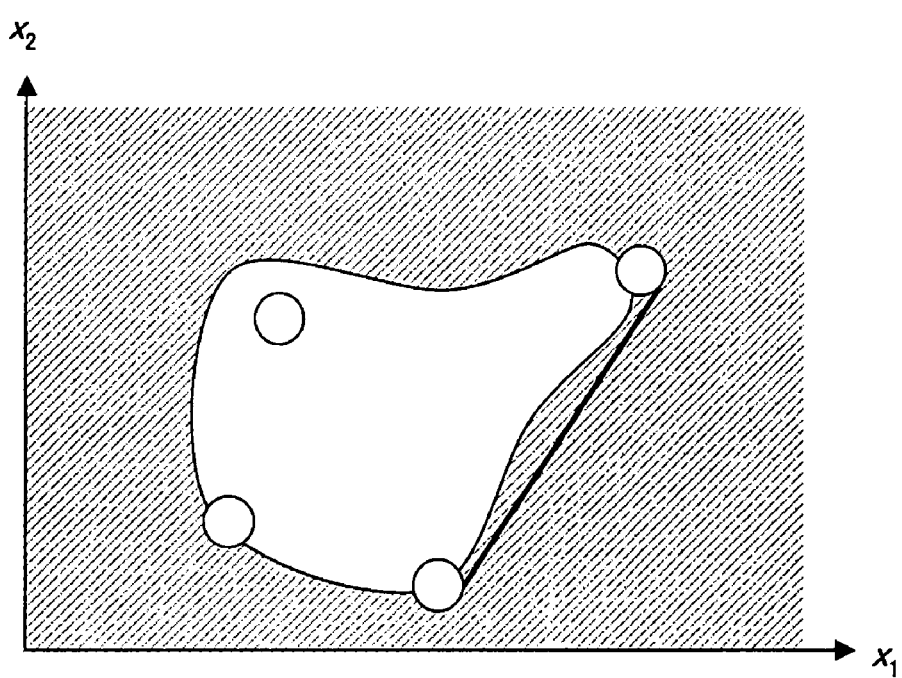
FIG. 12B shows the case in which the acceptable area is not formed in a convex shape.

To be exact, even in the single acceptable area, the deviation is possibly generated, when a hole exists in the acceptable area (FIG. 12A), or when the acceptable area is not formed in the convex shape (FIG. 12B). In such cases, since the defective area closer to the target value than the acceptable area, it is not a proper acceptable area. Therefore, such cases can be removed by the parameter adjustment.

(3) Area Parameter of Non-Parametric Discrimination

Figure 13A:
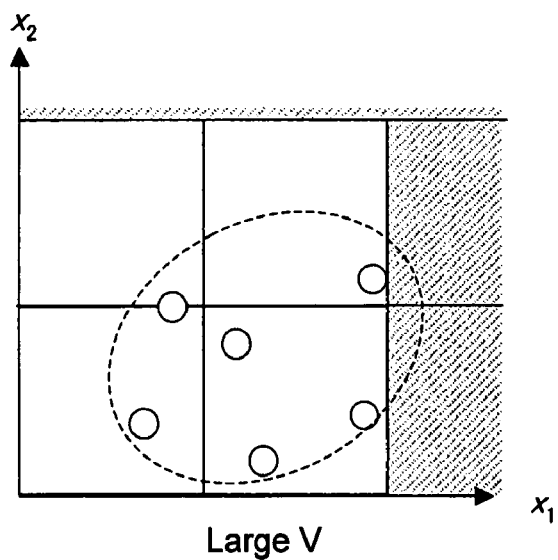
FIG. 13A shows the case of the large volume V.
Figure 13B:
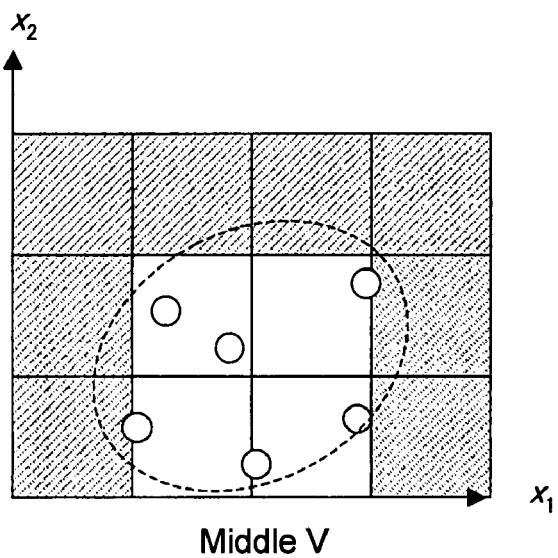
FIG. 13B shows the case of the middle volume V.
Figure 13C:
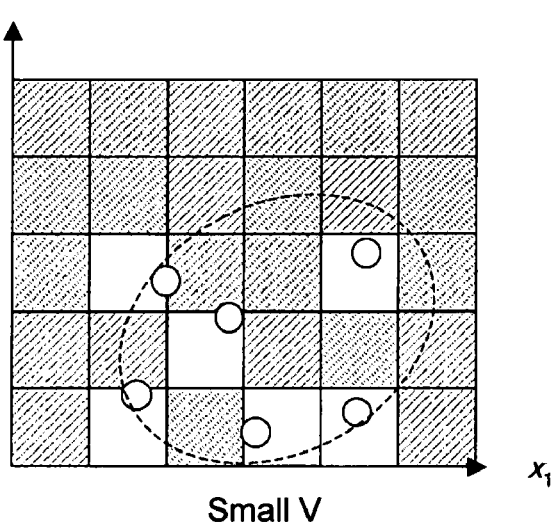
FIG. 13C shows the case of the small volume V.
Figure 14A:
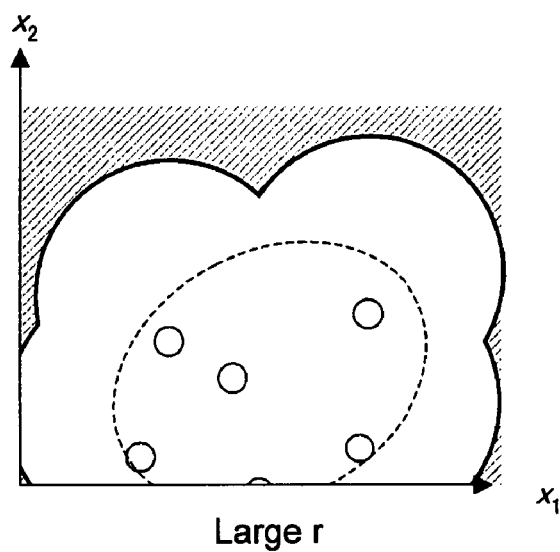
FIG. 14A shows the case of the large radius r.
Figure 14B:
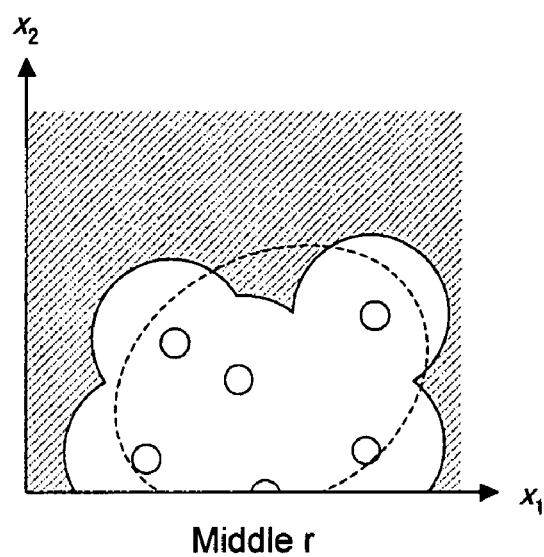
FIG. 14B shows the case of the middle radius r.
Figure 14C:
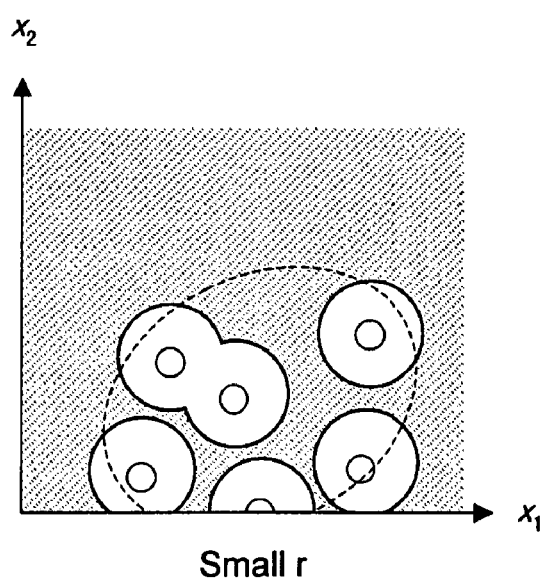
FIG. 14C shows the case of the small radius r.
Figure 15A:
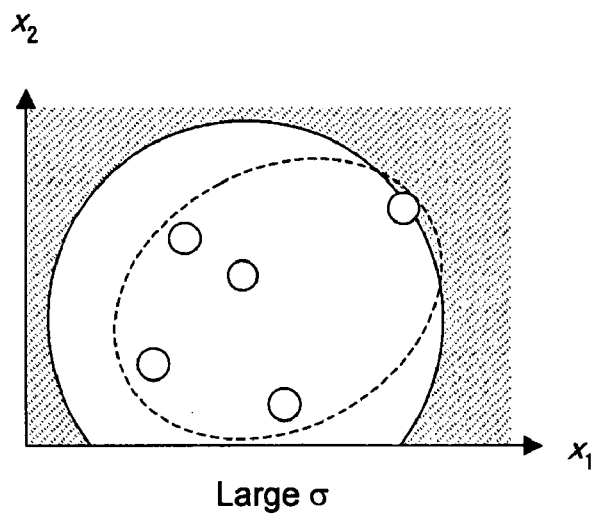
FIG. 15A shows the case of the large width σ.
Figure 15B:
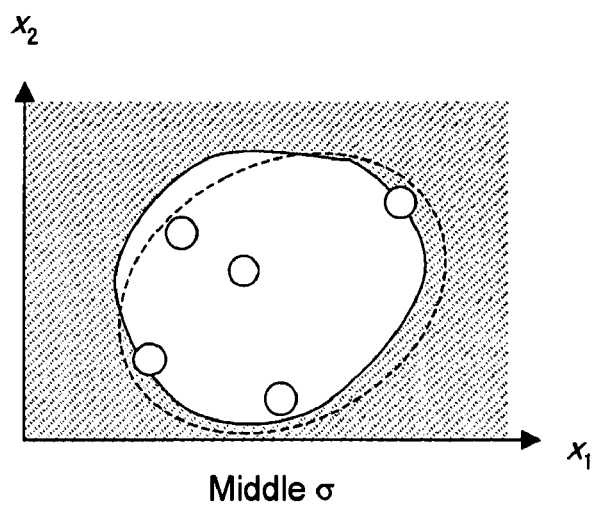
FIG. 15B shows the case of the middle width σ.
Figure 15C:
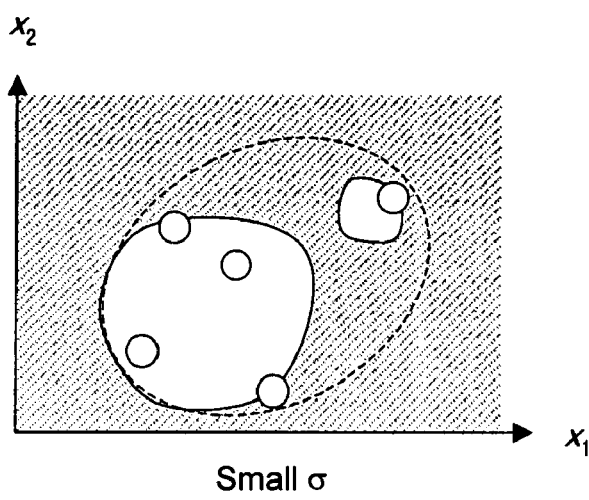
FIG. 15C shows the case of the small width σ.

FIGS. 13 to 15 show a change in acceptable area according to a change in area parameter of the non-parametric discrimination. FIG. 13 shows the histogram method, FIG. 14 shows the nearest neighbors estimation, and FIG. 15 shows the one-class SVM. Each part A of FIGS. 13 to 15 shows the large area parameter, each part B shows the middle area parameter, and each part C shows the small area parameter.

The discrimination function of the non-parametric discrimination has the area parameter of a function which becomes a basis of the density function. Specifically, the area parameter is the volume V of the hyper cube in the histogram method, the area parameter is the radius r of the hypersphere in the nearest neighbor estimation, and the area parameter is the width $\sigma$ of the Gaussian kernel in the one-class SVM.

As the basis function area is increased, the acceptable area is also increased. Therefore, when the basis function area is too small, there is an increased risk of a first kind of error (error in which the acceptable product is discriminated as the defective product). When the basis function area is too large, there is an increased risk of a second kind of error (error in which the defective product is discriminated as the acceptable product). The acceptable area is divided into a plurality of areas in the case of the small basis function area, and the single acceptable area is easily formed in the case of the large basis function area.

(Area Parameter Adjustment)

Figure 26A:
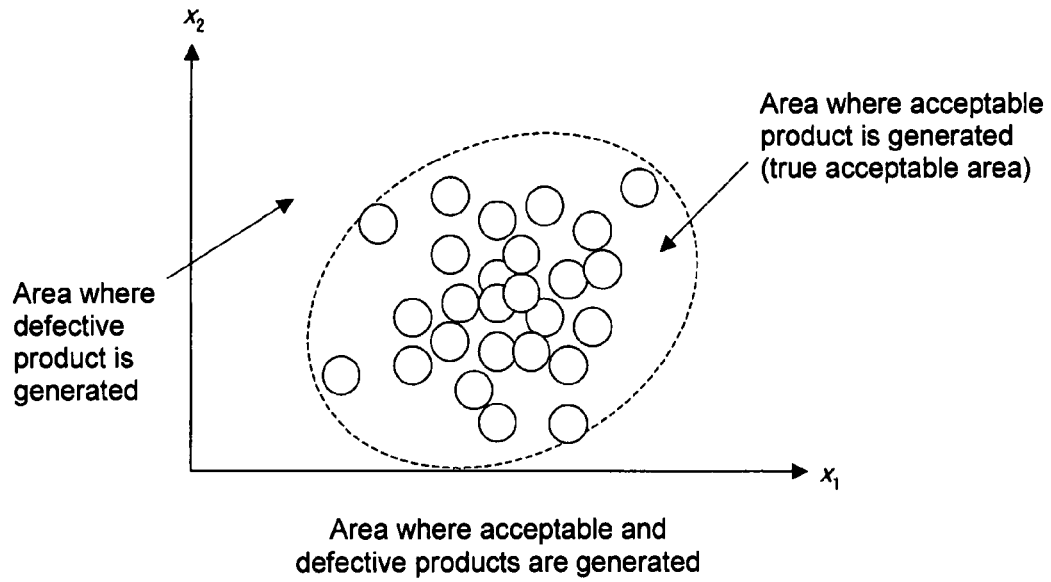
FIG. 26A shows an area where the acceptable product and the defective product occur.
Figure 26B:
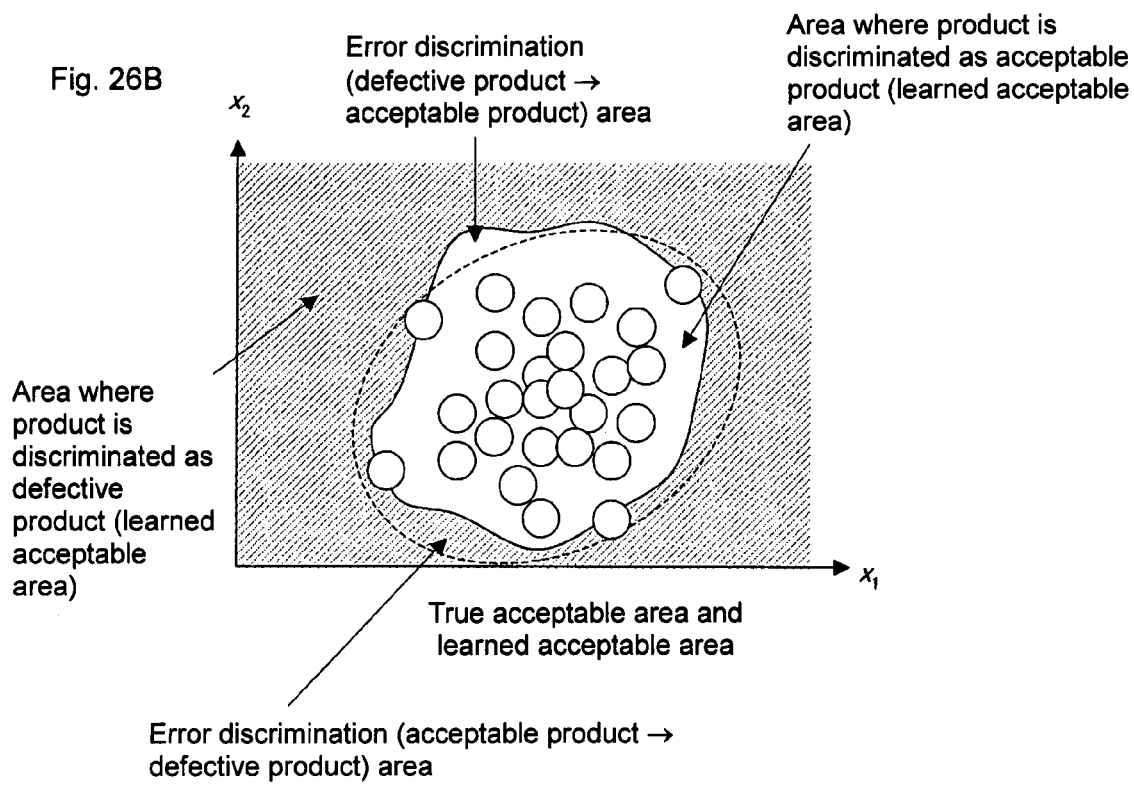
FIG. 26B shows a true acceptable area and the learned acceptable area.
Figure 27A:
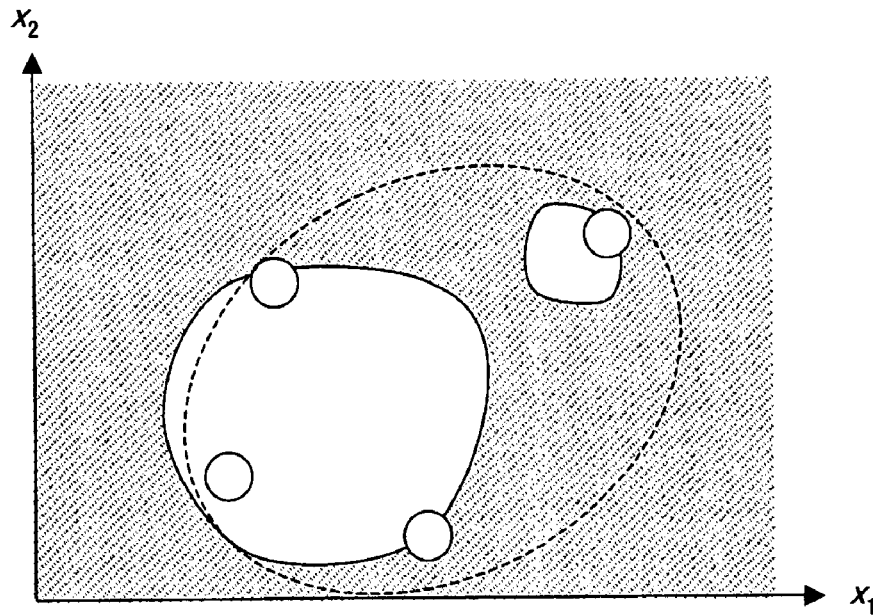
FIG. 27A shows the case in which the acceptable area is divided into a plurality of areas.
Figure 27B:
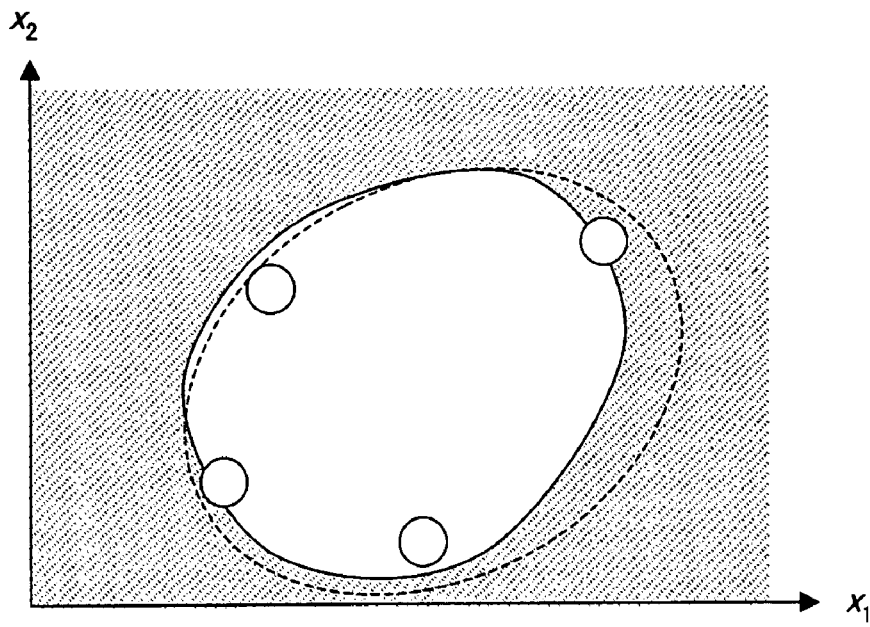
FIG. 27B shows the single acceptable area.

As shown in FIG. 26B, actually the acceptable area (learned acceptable area) formed by the discrimination function which learns from the limited samples differs from the true acceptable area. When the true acceptable area differs largely from the learned acceptable area, a risk of false discrimination is increased. Therefore, the area parameter is adjusted to bring the learned acceptable area close to the true acceptable area.

A probability of discriminating the defective product as the acceptable product is increased when the adjustment is performed to widen the learned acceptable area. On the other hand, a probability of discriminating the acceptable product as the defective product is increased when the adjustment is performed to narrow the learned acceptable area.

In the case where prior knowledge does not exist for the true acceptable area, the adjustment is performed to minimize an expected error rate (a probability of emergence of an unknown sample in a false discrimination area). When the number of learning samples is small, reliability of performance evaluation becomes low. Therefore, in the area parameter adjustment, there is a high possibility that the error rate cannot sufficiently be minimized.

A method (cross verification, leave-one-out method) in which part of the obtained samples is left for evaluating the discrimination performance and the remaining is used for the learning can be adopted in the area parameter adjustment.

[Apparatus Configuration]

As shown in FIG. 2, in the inspection apparatus 100, signals from a microphone 102 and an acceleration pickup 103 are amplified by an amplifier 104. The microphone 102 and the acceleration pickup 103 are arranged to be brought into contact with or close to an inspection target 101. Then, an AD converter 105 converts the signal into digital data, and the AD converter 105 outputs the digital data. In a mass production trial phase, or after the start of mass production, the data such as operation timing can also be obtained from PLC (Programmable Logic Controller, not shown) which controls the production of the workpiece (product) at the production site. The inspection apparatus 100 obtains waveform data based on sound data collected by the microphone 102 and vibration data collected by the acceleration pickup 103, and the inspection apparatus 100 extracts the characteristic value to make an anomaly determination.

The inspection apparatus 100 is constituted by a computer which includes a CPU body 100a, an input device 100b such as a keyboard and a mouse, and a display 100c. If needed, the inspection apparatus 100 includes an external storage device, and the inspection apparatus 100 includes communication function so that necessary information can be obtained through communication with an external database.

In a basic algorithm of the inspection apparatus 100, determination knowledge used in making the anomaly determination is generated to perform anomaly detection based on the normal sample. As used herein, the anomaly detection shall mean that the product matched with a criterion is regarded as the acceptable product and the product not matched with the criterion is regarded as the defective product.

FIG. 1 shows a functional block diagram of the discrimination function decision unit 20 included in the inspection apparatus 100.

The discrimination function decision unit 20 decides the discrimination function used in the discrimination of the state of the inspection target. Specifically, the discrimination function decision unit 20 determines whether or not the discrimination function used in the non-parametric one-class discrimination forms the single acceptable area in the input space where the samples are plotted. When the discrimination function does not form the single acceptable area, the discrimination function decision unit 20 sets the area parameter such that the discrimination function forms the single acceptable area in the input space where the samples are plotted. The area parameter is one which regulates the size of the area of the basis function. The basis function regulates the discrimination function.

The discrimination function decision unit 20 includes a learning sample storage unit 21, a learning sample obtaining unit 22, a parameter candidate storage unit 23, a parameter setting unit 24, a discrimination function learning unit 25, an acceptable area number determination unit (discrimination function determination unit) 26, a discrimination function output unit 27, and a discrimination function storage unit 28.

In the learning, the learning sample obtaining unit 22 obtains the learning samples stored in the learning sample storage unit 21, and the learning sample obtaining unit 22 outputs the learning samples to the discrimination function learning unit 25.

The parameter setting unit 24 sets the area parameter such that the discrimination function forms the single acceptable area in the input space where the samples are plotted. The area parameter regulates the size of the area of the basis function which becomes the basis of the density function. The basis function regulates the discrimination function used in the non-parametric one-class discrimination. The area parameter may be selected from the parameter candidates stored in the parameter candidate storage unit 23.

The discrimination function learning unit 25 generates a discrimination function using the learning samples obtained by the learning sample obtaining unit 22 and the area parameter selected by the parameter setting unit 24. For example, the discrimination function learning unit 25 generates the discrimination function corresponding to the discrimination plane, in the case where the discrimination algorithm of the non-parametric one-class discrimination is the non-parametric one-class discrimination model having the feature that the learning sample on the discrimination plane is stored in the model.

The acceptable area number determination unit 26 determines whether or not the discrimination function used in the non-parametric one-class discrimination forms the single acceptable area in the input space where the samples are plotted. The same discrimination function as used in the inspection is used for the determination.

Specifically, the acceptable area number determination unit 26 selects the line segment used to determine whether or not the line segment deviates from the acceptable area from the following line segments.

(i) A line segment connecting the learning samples discriminated as the acceptable product (FIGS. 8A and 8B)

(ii) A line segment connecting the center (mean) of the learning samples discriminated as the acceptable product and the learning sample discriminated as the acceptable product (FIGS. 9A and 9B)

(iii) For example, in the case of SVM, a line segment connecting the margin support vectors (MSV) (FIGS. 10A and 10B)

(iv) For example, in the case of SVM, a line segment connecting the center (mean) of the learning samples discriminated as the acceptable product and the margin support vector (FIGS. 11A and 11B)

The acceptable area number determination unit 26 determines whether or not the line segment deviates from the acceptable area as follows.

(1) One or a plurality of points are extracted from the line segment, and the points is applied to the discrimination function to determine whether or not all the points are discriminated as the acceptable product, or (2) The minimum value of the discrimination function is obtained on the line segment to determine whether or not the minimum value is not lower than the predetermined threshold.

The type of the line segment used may be selected by a user using the input device 100b or previously be set. Whether confirming that the discrimination function is not lower than the threshold for the plurality of points extracted from the line segment or obtaining the minimum value of the discrimination function on the line segment by the optimizing technique to confirm that the minimum value is not lower than the threshold (sometimes the large and the small are reversed depending on function) may be selected by a user using the input device 100b or previously be set.

When the acceptable area number determination unit 26 determines that the discrimination function generated by the discrimination function learning unit 25 forms the single acceptable area, the discrimination function output unit 27 stores the discrimination function in the discrimination function storage unit 28.

The data used in the discrimination function decision unit 20 will be described with reference to FIG. 16.

FIG. 16A shows a data structure of a learning sample stored in the learning sample storage unit 21. As shown in FIG. 16A, the learning sample is stored in the learning sample storage unit 21 while sample ID (ID#) for identifying the sample, classification between the acceptable product and the defective product (Class), the characteristic value (x1, x2, . . . ) are correlated with one another.

FIG. 16B shows a parameter candidate stored in the parameter candidate storage unit 23. In FIG. 16B, the candidate of the width $\sigma$ of the Gaussian kernel is shown as an example of the one-class SVM.

FIG. 16C shows a discrimination function stored in the discrimination function storage unit 28. As shown in FIG. 16C, in the discrimination function, a rule is provided to compare a value of equation ($f(x)$) used in the discrimination to a threshold (0) to discriminate the acceptable product from the defective product.

Then, a discrimination function decision process performed by the discrimination function decision unit 20 included in the inspection apparatus 100 will be described.

Figure 17:
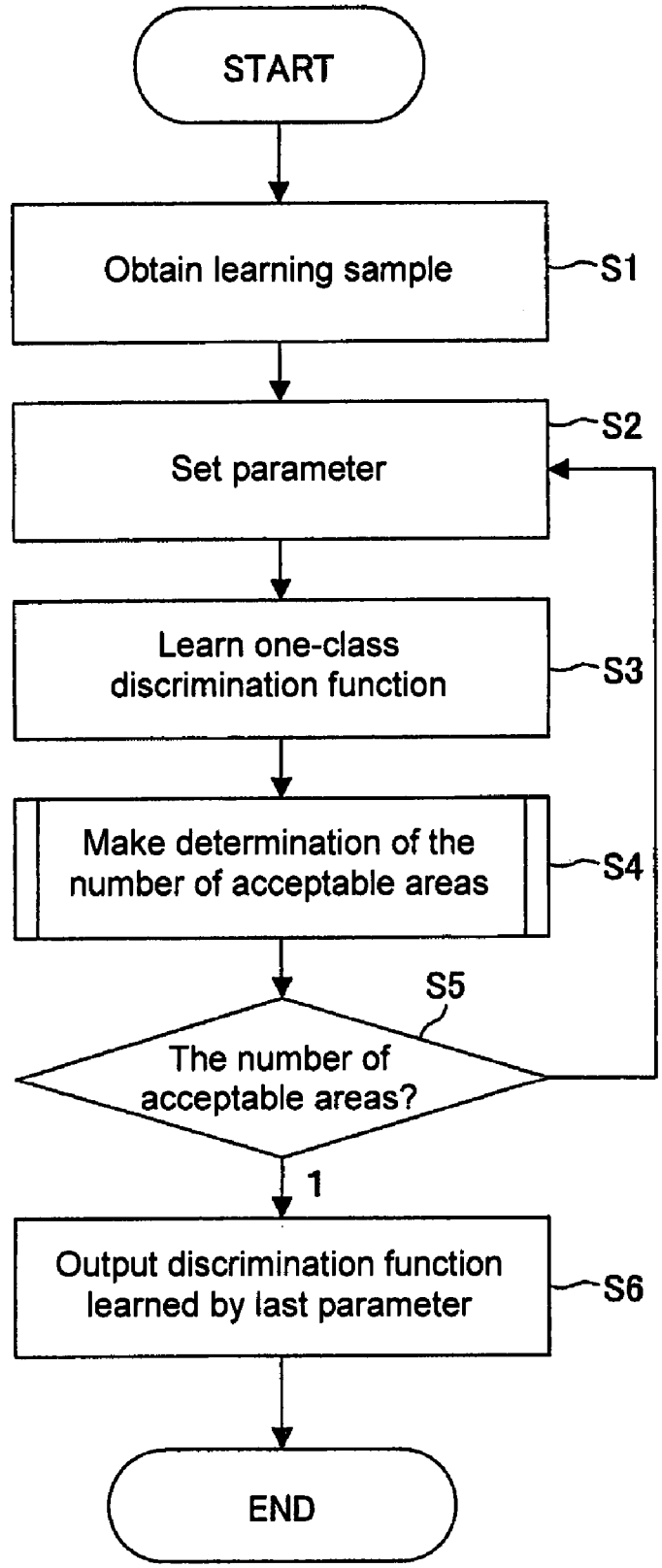
FIG. 17 shows a flowchart of a process performed by the discrimination function decision unit of FIG. 1.

FIG. 17 is a flowchart showing a discrimination function decision process performed by the discrimination function decision unit 20 included in the inspection apparatus 100.

The learning sample obtaining unit 22 obtains the learning samples from the learning sample storage unit 21, and the learning sample obtaining unit 22 outputs the learning samples to the discrimination function learning unit 25 (S1).

The parameter setting unit 24 obtains one area parameter candidate from the parameter candidate storage unit 23, and the parameter setting unit 24 outputs the area parameter candidate to the discrimination function learning unit 25 (S2).

The discrimination function learning unit 25 learns the one-class discrimination function using the learning samples inputted from the learning sample obtaining unit 22 and the area parameter inputted from the parameter setting unit 24 (S3).

The acceptable area number determination unit 26 determines whether or not the discrimination function forms the single acceptable area (S4). The discrimination function is generated as a result of the learning by the discrimination function learning unit 25. When the acceptable area number determination unit 26 determines that the discrimination function does not form the single acceptable area, the flow returns to Step S2, and the process is repeated from Step S2. On the other hand, when the acceptable area number determination unit 26 determines that the discrimination function forms the single acceptable area, the discrimination function output unit 27 stores the discrimination function generated by the discrimination function learning unit 25, i.e., the discrimination function learned by the last area parameter in the discrimination function storage unit 28.

In Step S2, desirably, the area parameter is sequentially set from the smaller parameter candidate enough to be divided into a plurality of areas. This is because the smallest area parameter is adopted in the case where a plurality of area parameters in which the acceptable areas become single exist. Therefore, the increase of the second kind of error (false discrimination in which the defective product is discriminated as the acceptable product) due to the excessively large area parameter (FIGS. 13A, 14A, and 15A) can be prevented.

On the contrary, in Step S2, the area parameter is sequentially set from the sufficiently large parameter candidate in which the acceptable area surely becomes single, and the parameter may be adopted immediately before the number of areas becomes two.

All the parameter candidates are adopted as the area parameter set in Step S2, and the plurality of area parameters in which the acceptable areas become single may be outputted. In this case, the parameter actually used in the inspection may be determined by a human, or the parameter actually used in the inspection may automatically be determined by a certain criterion. Desirably selecting the smallest area parameter from the outputted area parameters is used as the selection criterion.

Figure 18:
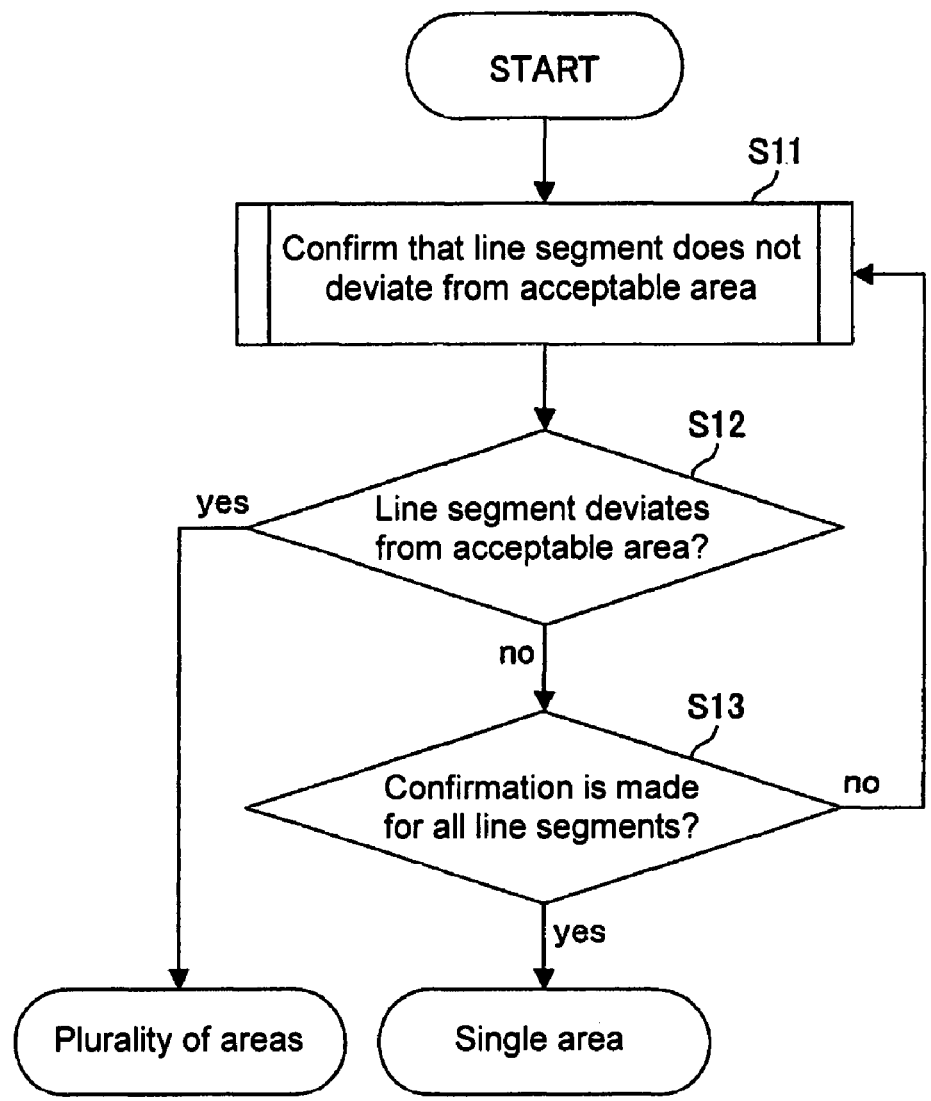
FIG. 18 shows a flowchart of a process performed by the acceptable area number determination unit of the discrimination function decision unit of FIG. 1.

FIG. 18 is a flowchart showing the acceptable area number determination process (S4 of FIG. 17) performed by the acceptable area number determination unit 26.

The acceptable area number determination unit 26 generates the line segments, and the acceptable area number determination unit 26 confirms whether or not the line segment deviates from the acceptable area (S11). Step S11 will be described in detail later.

When the line segment deviates from the acceptable area (Yes in Step S12), it is determined that a plurality of acceptable areas exist. On the other hand, when all the line segments do not deviate from the acceptable area (No in Step S12 and Yes in Step S13), it is determined that the acceptable area is single.

Figure 19:
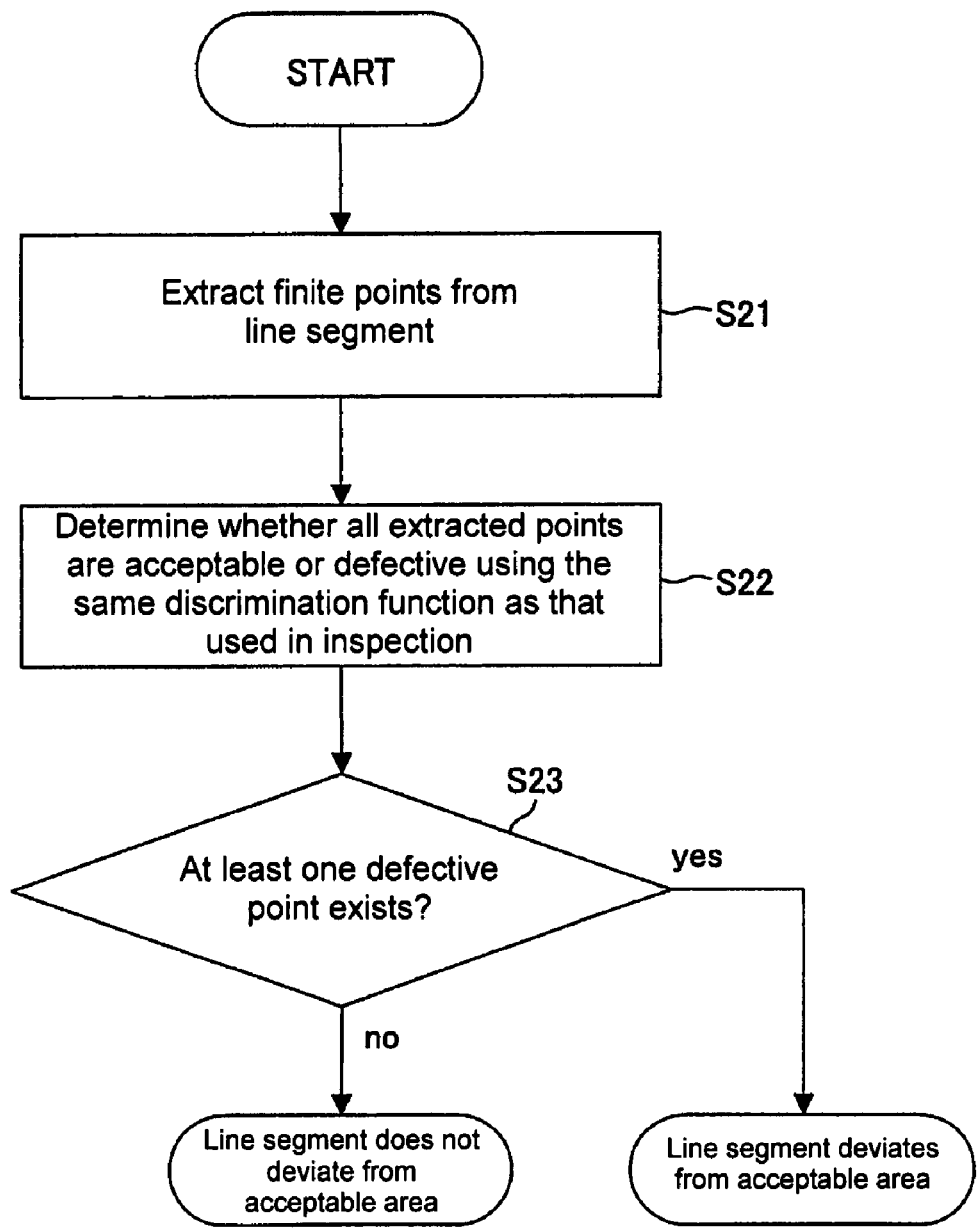
FIG. 19 shows a flowchart of a procedure of confirming that a discrimination function is not lower than a threshold for a plurality of points extracted from the line segment in an acceptable area number determination process performed by the discrimination function decision unit of FIG. 1.
Figure 20A:
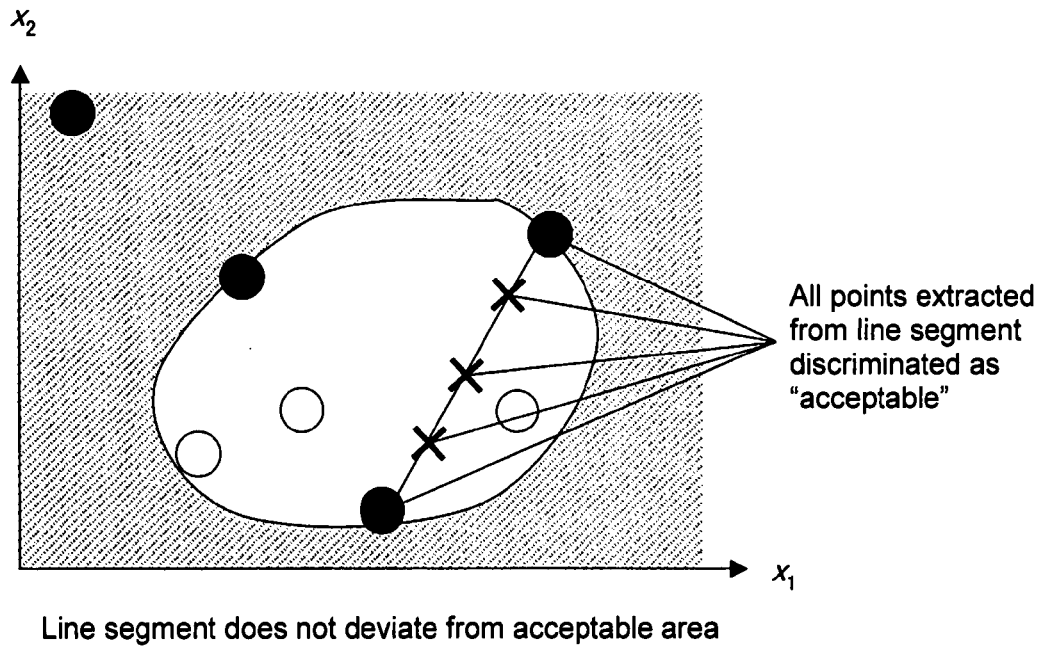
FIG. 20A shows the case in which the line segment does not deviate from the acceptable area.
Figure 20B:
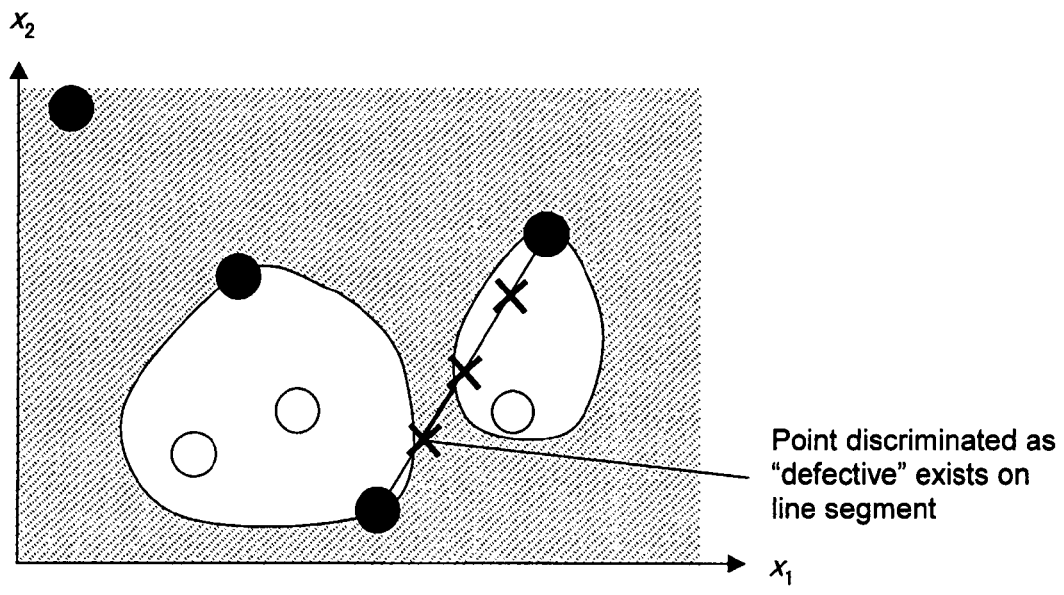
FIG. 20B shows the case in which the line segment deviates from the acceptable area.

FIG. 19 is a flowchart showing a procedure of confirming that the discrimination function is not lower than the threshold for a plurality of points extracted from the line segment in the acceptable area number determination process (S4 of FIG. 17 and S11 of FIG. 18) performed by the acceptable area number determination unit 26. FIG. 20 is a view explaining the procedure of FIG. 19.

The acceptable area number determination unit 26 extracts the limited number of points from the line segment ("x" mark in FIGS. 20A and 20B) (S21).

Then, using the same discrimination function as that used in the inspection, the acceptable area number determination unit 26 determines whether all the extracted points are acceptable or defective (S22). When at least one defective point exists (Yes in Step S23, FIG. 20B), the acceptable area number determination unit 26 determines that the line segment deviates from the acceptable area. On the other hand, when no defective point exists (No in Step S23, FIG. 20A), the acceptable area number determination unit 26 determines that the line segment does not deviate from the acceptable area.

In the case where the points extracted from the line segment are matched with the learning sample (or margin support vector in the case of SVM) discriminated as the acceptable product, the above determination may be omitted. In the case where one end of the line segment is set to the center of the learning sample discriminated as the acceptable product, when the points extracted from the line segment are matched with the center of the learning sample discriminated as the acceptable product, the determination is made once at first, and the line segment deviation determination may not individually be made.

FIG. 21 shows a specific example of data generated in extracting the point from the line segment when the line segment deviation determination is made according to the procedure shown in FIG. 19. In FIG. 21, the line segment is equally divided into four portions. The acceptable area number determination unit 26 generates these pieces of data and the acceptable area number determination unit 26 stores the data in a memory (not shown) of the discrimination function decision unit 20.

FIG. 21A shows the case in which five points including both ends are extracted to register coordinates thereof. As shown in FIG. 21A, line segment ID (line segment ID#) for identifying the line segment, extraction point serial number given in each line segment, and the characteristic value (x1, x2, . . . ) corresponding to the coordinate which is generated by equally dividing the line segment are correlated with one another in the data of each extracted point. Thus, in FIG. 21A, the five points including both ends are extracted and the coordinates thereof are registered. The line segment ID in which the sample IDs of the samples at both ends are coupled can be utilized.

FIG. 21B shows the case in which data registration is omitted for both ends of the line segment. In the case where the determination of the learning samples, located at both ends of the line segment, which is discriminated as the acceptable product is omitted, it is not necessary that the acceptable area number determination unit 26 register the data in the memory.

FIG. 21C shows the case in which one end of the line segment is the center of a learning sample discriminated as the acceptable product. In the case where one end of the line segment is the center of the learning sample discriminated as the acceptable product, the acceptable area number determination unit 26 registers the center independently from the line segment, and the acceptable area number determination unit 26 may not register the center in the point extracted in each line segment.

Figure 22:
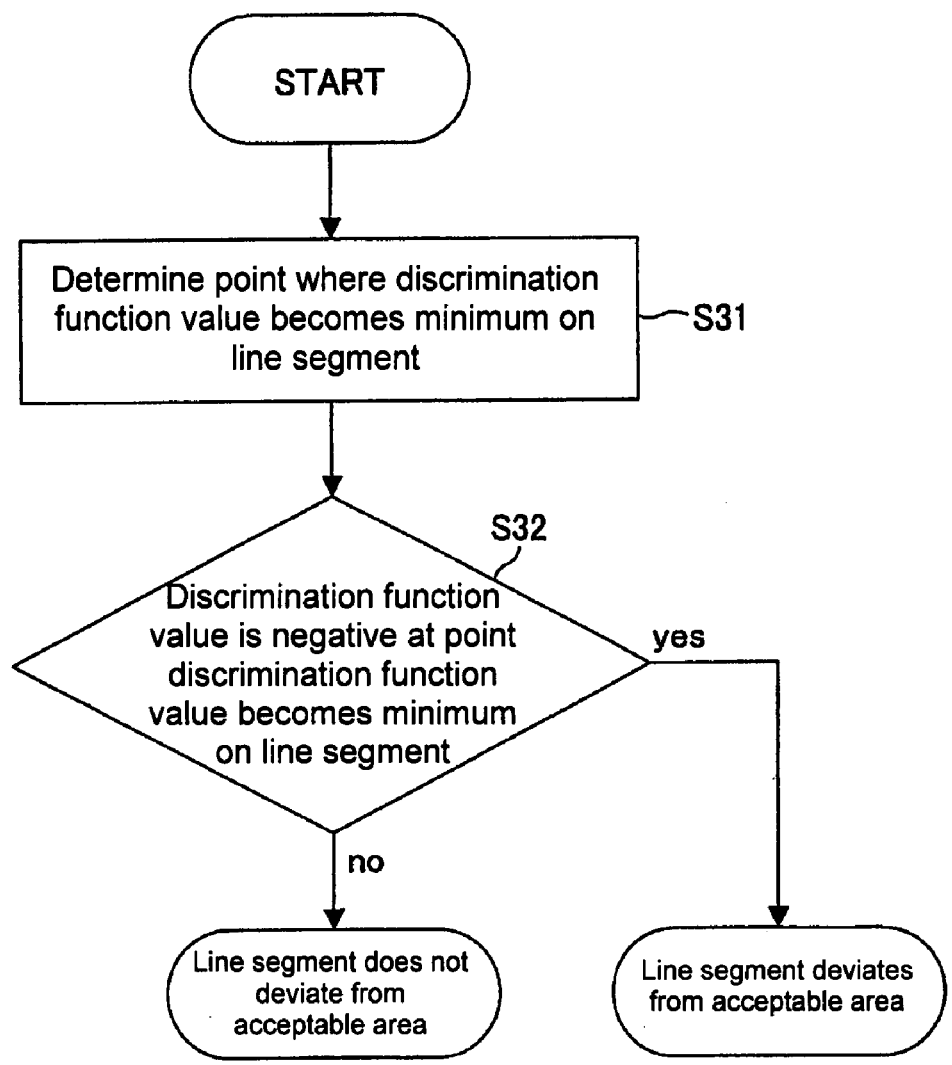
FIG. 22 shows a flowchart of a procedure of confirming that the minimum value is not lower than a threshold in the acceptable area number determination process performed by the discrimination function decision unit of FIG. 1.

FIG. 22 is a flowchart showing a procedure of determining the minimum value of the discrimination function on the line segment by the optimizing technique to confirm that the minimum value is not lower than a threshold (sometimes the large and the small are reversed depending on function) in the acceptable area number determination process performed by the acceptable area number determination unit 26. FIG. 23 is a view explaining the procedure of FIG. 23.

The acceptable area number determination unit 26 determines the point on the line segment at which the discrimination function value becomes the minimum (S31).

The acceptable area number determination unit 26 determines whether or not the discrimination function value becomes negative at the point at which the discrimination function value becomes the minimum (S32). When the discrimination function value becomes negative (discriminated as defective product) (Yes in Step S32), the acceptable area number determination unit 26 determines that the line segment deviates from the acceptable area. On the other hand, when the discrimination function value is not negative (No in Step S32), the acceptable area number determination unit 26 determines that the line segment does not deviate from the acceptable area.

Figure 23A:
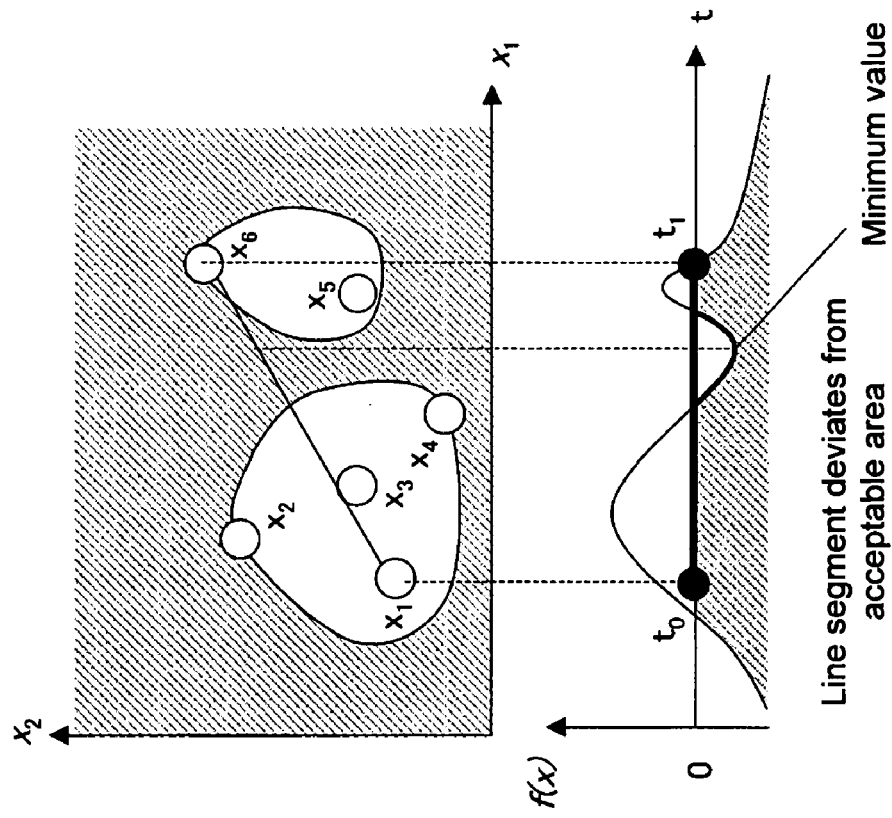
FIG. 23A shows the case in which the line segment does not deviate from the acceptable area.
Figure 23B:
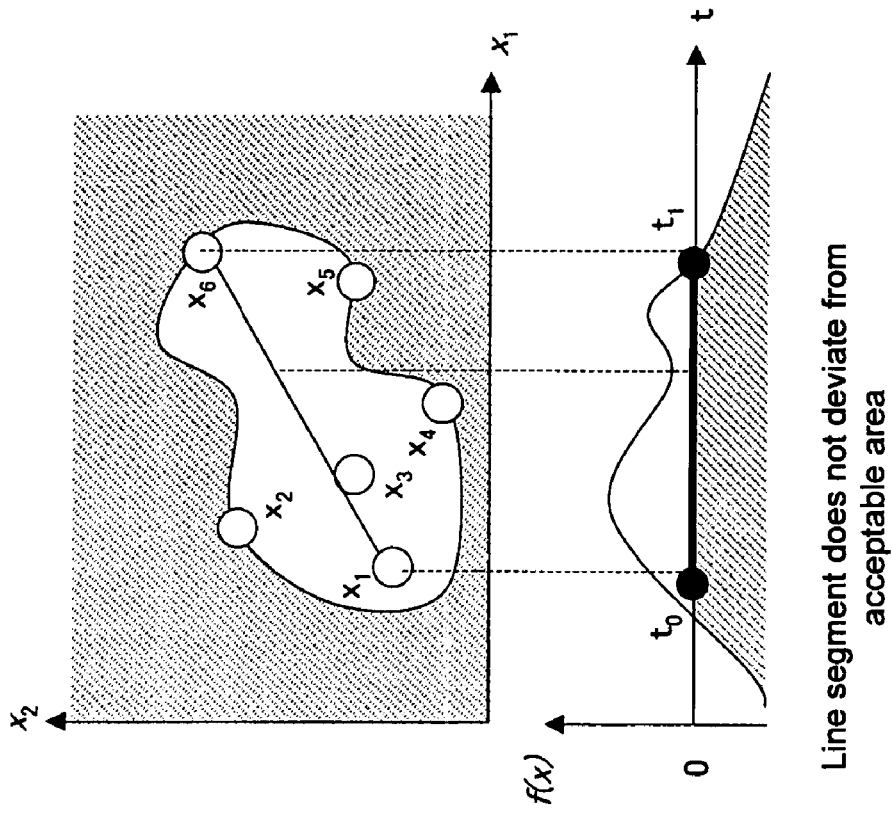
FIG. 23B shows the case in which the line segment deviates from the acceptable area.
Figure 24:
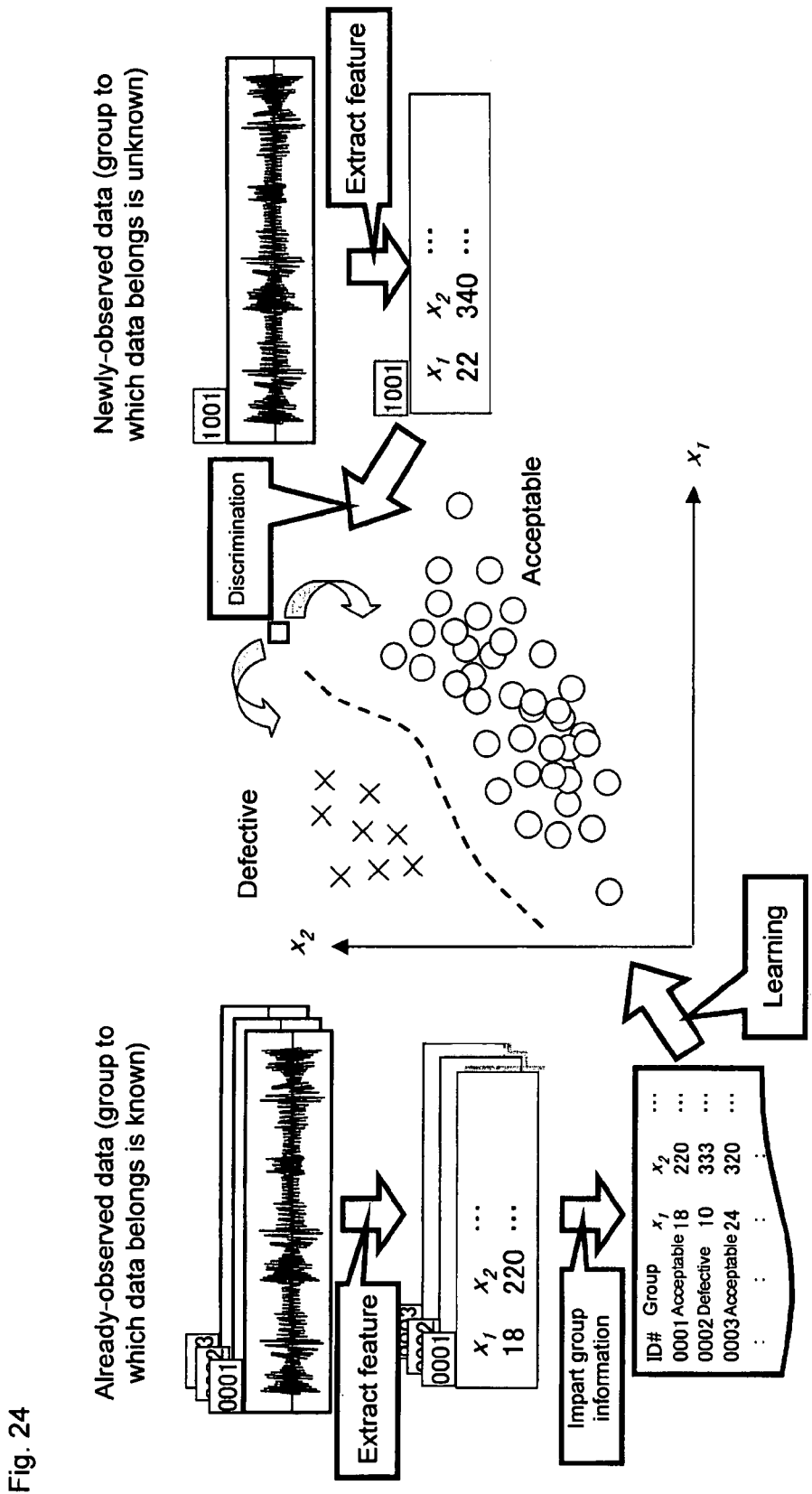
FIG. 24 shows a procedure of pattern recognition.
Figure 25A:
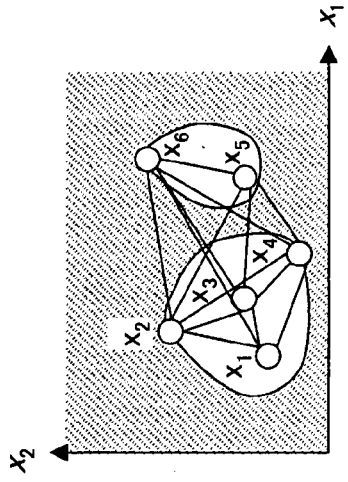
FIG. 25 shows a matrix in which the presence or absence of the deviation of the line segment connecting the learning samples from the acceptable area is expressed by 0 and 1.
FIG. 25B shows the matrix of FIG. 25A in the case of the single acceptable area.
FIG. 25D shows the matrix of FIG. 25C in the case of the two acceptable areas.
Figure 25B:
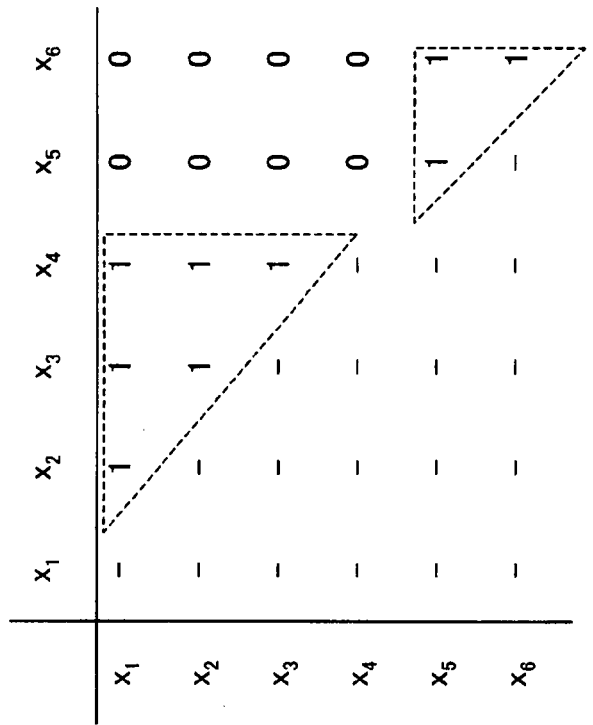
Figure 25C:
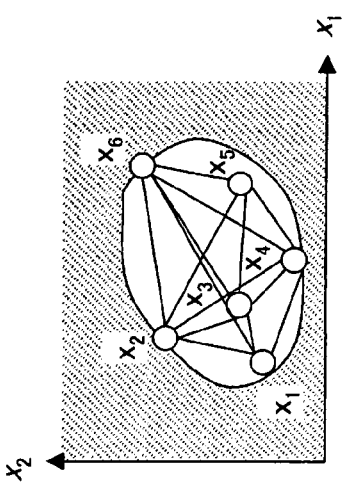
Figure 25D:
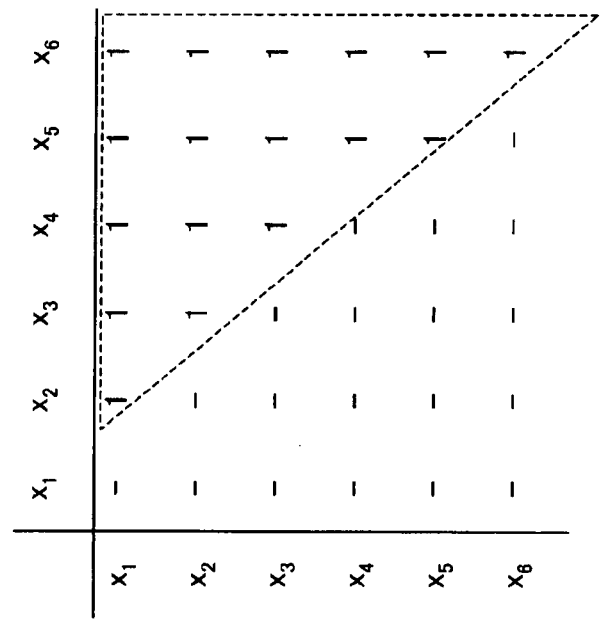

As shown in FIG. 23, the discrimination function value on the line segment becomes a non-linear continuous function of a position parameter t (t is a function of x) on the line segment. Therefore, the minimum value of the discrimination function is determined within the range of the line segment by the non-linear optimizing technique such as a Newton method and a steepest descent method, and the acceptable area number determination unit 26 confirms that the minimum value is lower than the predetermined threshold. For example, in the case of the discrimination function having the threshold of zero, the acceptable area number determination unit 26 determines that the line segment does not deviate from the acceptable area (FIG. 23A) when the minimum value of the discrimination function is not lower than zero, the acceptable area number determination unit 26 determines that the line segment deviates from the acceptable area (FIG. 23B) when the minimum value of the discrimination function becomes negative.

The inspection apparatus 100 can be applied to the inspection fields of the abnormal noise, assembly mistake, and output characteristics. The inspection apparatus 100 can be applied to both the in-line of the mass production and the off-line in which a production prototype is inspected. Specifically, the inspection apparatus 100 can be applied as the inspection machines for the automobile drive module such as the automobile engine (sound) and the transmission (vibration) and the inspection machines for the automobile motor actuator module such as the electric door mirror, the electric power seat, and the electric column (steering positioning). The inspection apparatus 100 can also be applied for the evaluation device for abnormal noise, assembly mistake, and output characteristics in the development of the automobile, and the evaluation device for the prototype machine in the development phase.

The inspection apparatus 100 can be applied as the inspection machines for the motor-driven home electric appliances such as the refrigerator, the air conditioner, the washing machine, the vacuum cleaner, and the printer. The inspection apparatus 100 can also be applied as the evaluation device for abnormal noise, assembly mistake, and output characteristics in the development of the motor-driven home electric appliances. Moreover, the inspection apparatus 100 can be applied as the facility diagnosis device for performing the state determination (anomaly state/normal state) of the facilities such as the NC machine, the semiconductor plant, food-industry plant.

One or more embodiments according to the present invention are applied to the inspection apparatus which discriminates the acceptable product from the defective product. The sample is the data satisfying the following conditions (1) to (3), and any sample may be used as long as the particular area is discriminated from other areas using the non-parametric one-class discrimination.

(1) The sample of the pieces of data having the target value (2) The sample constituting one group around the target value (3) The sample in which a variation occurs in the pieces of data due to external factors such as an environment In one or more embodiments according to the present invention, the one-class SVM is used as the discrimination algorithm of the non-parametric one-class discrimination. Any discrimination algorithm may be used as long as non-parametric one-class discrimination model in which the learning sample on the discrimination plane is stored in the model is used. In the "support vector" in the embodiment according to the present invention, any sample may be used as long as the "learning sample is stored in the model". In the "margin support vector", any sample may be used as long as the "learning sample on the discrimination plane is stored in the model".

The present invention is not limited to the above described embodiments, instead various changes and modifications can be made without departing from the scope of the invention. The embodiments obtained by appropriate combination of the technical constituents shall be included in the technical scope of the invention.

The inspection apparatus according to one or more embodiments of the present invention is one which discriminates the acceptable product from the defective product using the non-parametric one-class discrimination, and the inspection apparatus according to the present invention may include a unit which confirms that the acceptable area is single in the learning.

The inspection apparatus according to one or more embodiments of the present invention is one which discriminates the acceptable product from the defective product using the non-parametric one-class discrimination, and the inspection apparatus of the present invention may include a unit which adjusts the parameter such that the acceptable area becomes single in the learning.

In the inspection apparatus, the unit which confirms that the acceptable area is single may be one which confirms that the line segment connecting the learning samples discriminated as the acceptable product does not deviate from the acceptable area.

In the inspection apparatus according to one or more embodiments of the present invention, the unit which confirms that the acceptable area is single may be one which confirms that the line segment connecting the center of the learning sample and the learning sample discriminated as the acceptable product does not deviate from the acceptable area. It is not always necessary that the learning sample used in determining the center be the sample discriminated as the acceptable product.

In the inspection apparatus according to one or more embodiments of the present invention, the unit which confirms that the acceptable area is single may be one which confirms that the line segment connecting the margin support vectors (MSV) in the case of SVM does not deviate from the acceptable area.

In the inspection apparatus according to one or more embodiments of the present invention, the unit which confirms that the acceptable area is single may be one which confirms that the line segment connecting the center of the learning sample and the margin support vector (MSV) in the case of SVM does not deviate from the acceptable area.

In the inspection apparatus according to one or more embodiments of the present invention, the unit which confirms that the line segment does not deviate from the acceptable area may determine that all the points are acceptable product when the discrimination is performed to the finite points extracted from the line segment.

In the inspection apparatus according to one or more embodiments of the present invention, the unit which confirms that the line segment does not deviate from the acceptable area may determine the minimum value of the discrimination function on the line segment by the optimizing technique to confirm that the minimum value is not lower than the threshold (sometimes the large and the small are reversed depending on function).

Each block of the inspection apparatus 100, particularly, the learning sample obtaining unit 22, parameter setting unit 24, discrimination function learning unit 25, acceptable area number determination unit 26, and discrimination function output unit 27 which are included in the discrimination function decision unit 20 may be configured by hardware logic, or realized by software using CPU in the following manner.

The inspection apparatus 100 includes CPU (Central Processing Unit) which executes the command of the control program for realizing each function, ROM (Read Only Memory) in which the control program is stored, RAM (Random Access Memory) in which the control program is expanded, and storage device (recording medium) such as the memory in which the control program and various kinds of data are stored. The recording medium in which the program code (executable format program, intermediate code program, and source program) of the control program is stored in a computer-readable manner, the recording medium is supplied to the inspection apparatus 100, and the computer (or CPU or MPU) reads and executes the program code recorded in the recording medium. Therefore, one or more embodiments of the present invention can be achieved by software for realizing the above functions.

Examples of the recording medium include tape systems such as magnetic tape and cassette tape, disk systems such as magnetic disk including floppy (registered trademark) disk/hard disk and optical disk including CD-ROM/MO/MD/DVD/CD-R, card systems such as an IC card (including memory card) and an optical card, and semiconductor memory systems such as mask ROM, EPROM, EEPROM, and flash ROM.

The inspection apparatus 100 may be connected to the communication network to supply the program code through the communication network. The communication network is not particularly limited. For example, the Internet, an intranet, an extranet, LAN, ISDN, VAN, a CATV communication network, a virtual private network, a public telephone line, a mobile communication network, and a satellite communication network can be utilized. Examples of a transmission medium constituting the communication network include wired lines such as IEEE 1394, USB, power-line carrier, a cable TV line, a telephone line, and an ADSL line and wireless lines such as infrared ray such as IrDA and a remote controller, Bluetooth®, 802.11 wireless, HDR, a portable telephone network, a satellite line, and a digital terrestrial network. The present invention is also realized in the mode of the computer data signal embedded in the carrier wave, which is embodied by the electronic transmission of the program code.

In the inspection apparatus according to one or more embodiments of the present invention, the discrimination function used in the non-parametric one-class discrimination is determined such that the signal acceptable area is formed in the input space where the samples are plotted. Therefore, the inspection apparatus according to the present invention can widely be applied to the inspection apparatus in the manufacturing line and the evaluation device for the machine operation. In addition to the product inspection, the inspection apparatus according to the present invention can be applied to fault detection for the manufacturing apparatus and electric power facility, human medical health care, and the like.

The inspection apparatus according to one or more embodiments of the present invention includes the discrimination function determination unit which determines whether or not the discrimination function used in the non-parametric one-class discrimination forms the area including the sample to be discriminated into the class as the single area in the input space where samples are plotted.

In the inspection method according to one or more embodiments of the present invention, the discrimination function determination unit included in the inspection apparatus determines whether or not the discrimination function used in the non-parametric one-class discrimination forms the area including a sample to be discriminated into the class as the single area in the input space where samples are plotted.

As a result of the determination, when the discrimination function does not form the single area, namely, when the area including the sample to be discriminated in the class is divided into a plurality of areas, the area parameter regulating the size of the area of the basis function is changed such that the discrimination function forms the single area, and thereby the discrimination function can be learned again. Accordingly, the area including the sample to be discriminated in the class is made to be single, and the area is brought close to the true area, so that the discrimination performance can be improved.

The inspection apparatus according to one or more embodiments of the present invention includes the parameter setting unit which sets the area parameter such that the discrimination function forms the single area in the input space where samples are plotted, when the discrimination function determination unit determines that the discrimination function does not form the single area, the area parameter regulating the size of an area of the basis function, the basis function regulating the discrimination function, the basis function becoming the basis of the density function.

In the inspection method according to one or more embodiments of the present invention, the parameter setting unit included in the inspection apparatus sets the area parameter such that the discrimination function forms an area including the sample to be discriminated in the class as the single area in the input space where samples are plotted, when the discrimination function determination unit determines that the discrimination function does not form the single area, the area parameter regulating the size of the area of the basis function, the basis function regulating the discrimination function to be used in the non-parametric one-class discrimination, the basis function becoming the basis of the density function.

When the discrimination function does not form the single area, namely, when the area including the sample to be discriminated in the class is divided into a plurality of areas, the area parameter is changed such that the discrimination function forms the single area, and thereby the discrimination function can be learned again. Accordingly, the area including the sample discriminated in the class is made to be single, and the area is brought close to the true area, so that the discrimination performance can be improved.

According to the above configuration, the area parameter can be set such that the discrimination function forms the single area in the input space where the samples are plotted. The area parameter regulates the size of the area of the basis function which becomes the basis of the density function. The basis function regulates the discrimination function to be used in the non-parametric one-class discrimination. Specifically, examples of the area parameter include the volume V of the hypercube in the histogram method, the radius r of the hypersphere in the nearest neighbor estimation, and the width $\sigma$ of the Gaussian kernel in the one-class SVM.

When the discrimination function does not form the single area, namely, when the area including the sample to be discriminated in the class is divided into a plurality of areas, the area parameter is changed such that the discrimination function forms the single area, and thereby the discrimination function can be learned again. Accordingly, the area including the sample to be discriminated in the class is made to be single, and the area is brought close to the true area, so that the discrimination performance can be improved.

In the inspection apparatus according to the present invention, preferably the discrimination algorithm of the non-parametric one-class discrimination stores the sample on the discrimination plane in the model.

The one-class support vector machine can be cited as an example of the discrimination algorithm of the one-class discrimination in which the sample on the discrimination plane is stored in the model. Generally, the support vector machine has the following features compared with the usual non-parametric discrimination algorithm: (i) The support vector machine has high generalization performance (discrimination performance for the unknown sample) and (ii) it is ensured that the support vector machine does not run into a local solution during the learning.

What is claimed is:

1. An inspection apparatus comprising:
a discrimination function determination unit that determines in an input space where learning samples are plotted, whether or not a discrimination function forms a single area,
wherein the area includes a discrimination sample discriminated into a class, and
wherein the discrimination function is used in non-parametric one-class discrimination.

2. An inspection apparatus according to claim 1, further comprising:
a parameter setting unit that sets an area parameter such that the discrimination function forms the single area, in the input space where learning samples are plotted, when the discrimination function determination unit determines that the discrimination function does not form the single area,
wherein the area parameter regulates a size of an area of a basis function,
wherein the basis function regulates the discrimination function, and
wherein the basis function becomes a basis of a density function.

3. An inspection apparatus according to claim 1, wherein a discrimination algorithm of the non-parametric one-class discrimination stores the discrimination sample on a discrimination plane in a model.

4. An inspection apparatus according to claim 1, wherein, when it is determined that discrimination samples are included in the single area, the discrimination function determination unit determines whether or not a line segment deviates from the single area,
wherein the line segment connects the discrimination samples.

5. An inspection apparatus according to claim 1, wherein, when it is determined that the discrimination sample is included in the single area with learning samples, the discrimination function determination unit determines whether or not a line segment deviates from the single area,
wherein the line segment connects a center of the learning samples and the discrimination sample.

6. An inspection apparatus according to claim 3, wherein, when discrimination samples are stored in the model, the discrimination function determination unit determines whether or not a line segment deviates from the single area, and
wherein the line segment connects the discrimination samples on a discrimination plane.

7. An inspection apparatus according to claim 3, wherein, when the discrimination sample and learning samples are stored in the model, the discrimination function determination unit determines whether or not a line segment deviates from the single area, and
wherein the line segment connects a center of the learning samples and the discrimination sample on the discrimination plane.

8. An inspection apparatus according to claim 4, wherein the discrimination function determination unit extracts one or a plurality of points from the line segment to apply the points to the discrimination function, and
wherein the discrimination function determination unit determines whether or not all the points are included in the single area.

9. An inspection apparatus according to claim 4, wherein the discrimination function determination unit obtains a minimum value of the discrimination function on the line segment to determine whether or not the minimum value is not lower than a predetermined threshold.

10. An inspection method performed by an inspection apparatus that decides a discrimination function used to discriminate a state of an inspection target, the inspection method comprising:
a step in which discrimination function determination unit determines in an input space where learning samples are plotted, whether or not a discrimination function forms a single area,
wherein the area includes a discrimination sample discriminated into a class, and
wherein the discrimination function is used in non-parametric one-class discrimination.

11. An inspection method according to claim 10, further comprising
a step in which a parameter setting unit included in the inspection apparatus sets an area parameter such that the discrimination function forms the single area, in the input space where learning samples are plotted, when the discrimination function determination unit determines that the discrimination function does not form the single area,
wherein the area parameter regulates a size of an area of a basis function,
wherein the basis function regulates the discrimination function to be used in the non-parametric one-class discrimination, and
wherein the basis function becomes a basis of a density function.

12. An inspection program which causes a computer to function as an inspection apparatus that decides a discrimination function used to discriminate a state of an inspection target,
wherein the inspection program causes the computer to execute a process to determine in an input space where learning samples are plotted, whether or not a discrimination function used in non-parameteric one-class discrimination forms a single area,
wherein the area includes a discrimination sample discriminated into a class.

* * * * *